(12) United States Patent
Doll et al.

(10) Patent No.: US 6,371,766 B1
(45) Date of Patent: Apr. 16, 2002

(54) PROGRAMMABLE VEHICLE MODEL

(75) Inventors: Brian C. Doll, Rochester; Kim A. Zeile, Clarkston; Thomas M. Sharples, Washington; John A. Fox, Waterford, all of MI (US)

(73) Assignee: Prefix Corporation, Rochester Hills, MI (US)

( * ) Notice: Subject to any disclaimer, the term of this patent is extended or adjusted under 35 U.S.C. 154(b) by 0 days.

(21) Appl. No.: 09/165,788

(22) Filed: Oct. 2, 1998

Related U.S. Application Data

(60) Provisional application No. 60/060,765, filed on Oct. 2, 1997.

(51) Int. Cl.[7] .............................. G09B 25/00; G09B 9/00
(52) U.S. Cl. ............................ 434/373; 434/62; 434/67; 434/71
(58) Field of Search ............................ 434/62, 66, 67, 434/69, 71, 373; 701/1; 296/187, 223

(56) References Cited

U.S. PATENT DOCUMENTS

| | | | |
|---|---|---|---|
| 3,915,492 A | 10/1975 | Agnese | 296/23 |
| 4,393,450 A | 7/1983 | Jerard | 364/474 |
| 4,697,240 A | 9/1987 | Cedar et al. | 364/474 |
| 4,998,050 A | 3/1991 | Nishiyama et al. | 318/568 |
| 5,096,254 A | 3/1992 | Sparke | 296/193 |
| 5,237,250 A | 8/1993 | Zeile et al. | 318/562 |
| 5,384,704 A | 1/1995 | Snyder et al. | 364/424 |
| 5,527,184 A * | 6/1996 | Trumbull | 434/69 |

OTHER PUBLICATIONS

Kobe, Gerry; Reconfigurable Interior Buck; Feb. 1995; Automotive Industries, Abstract.*
Moving Ahead . . . or back or up or down . . . *Partnership press.* Apr. 1991, vol. 2, No. 4.
Computerized Seating Buck: The Ultimate Sandbox, no publication title or date.

* cited by examiner

Primary Examiner—John Edmund Rovnak
(74) Attorney, Agent, or Firm—Young & Basile, PC

(57) ABSTRACT

A dimensionally adjustable vehicle component and/or a simulated entire vehicle includes body panels and vehicle components arranged in a simulated vehicle position and movably mounted on internal support structure for dimensional adjustment in fore/aft, up/down and lateral directions to form a variety of different spatial relationships between the vehicle components. A drive mechanism, typically including a motor and a rotatable drive shaft, is coupled to each dimensionally adjustable vehicle component support structure for adjusting the dimensional position of a selected component via control signals from a central controller. An encoder is coupled to each rotatable shaft output and generates actual travel position information for the controller to determine the actual position of the selected, dimensionally adjusted component.

67 Claims, 27 Drawing Sheets

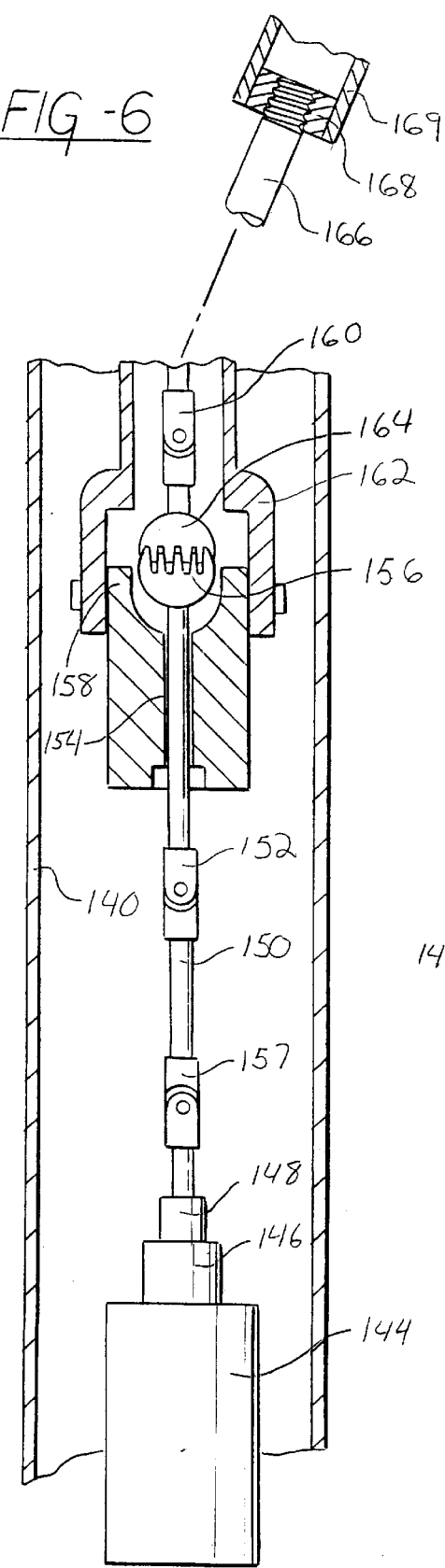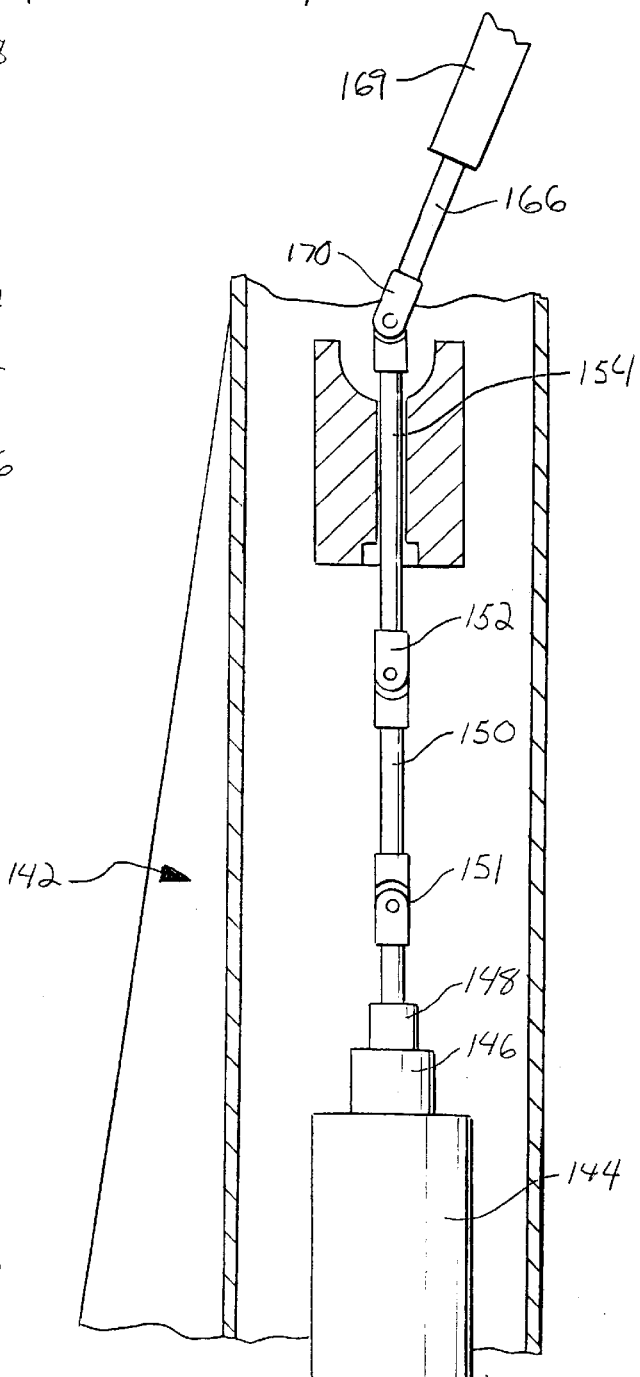

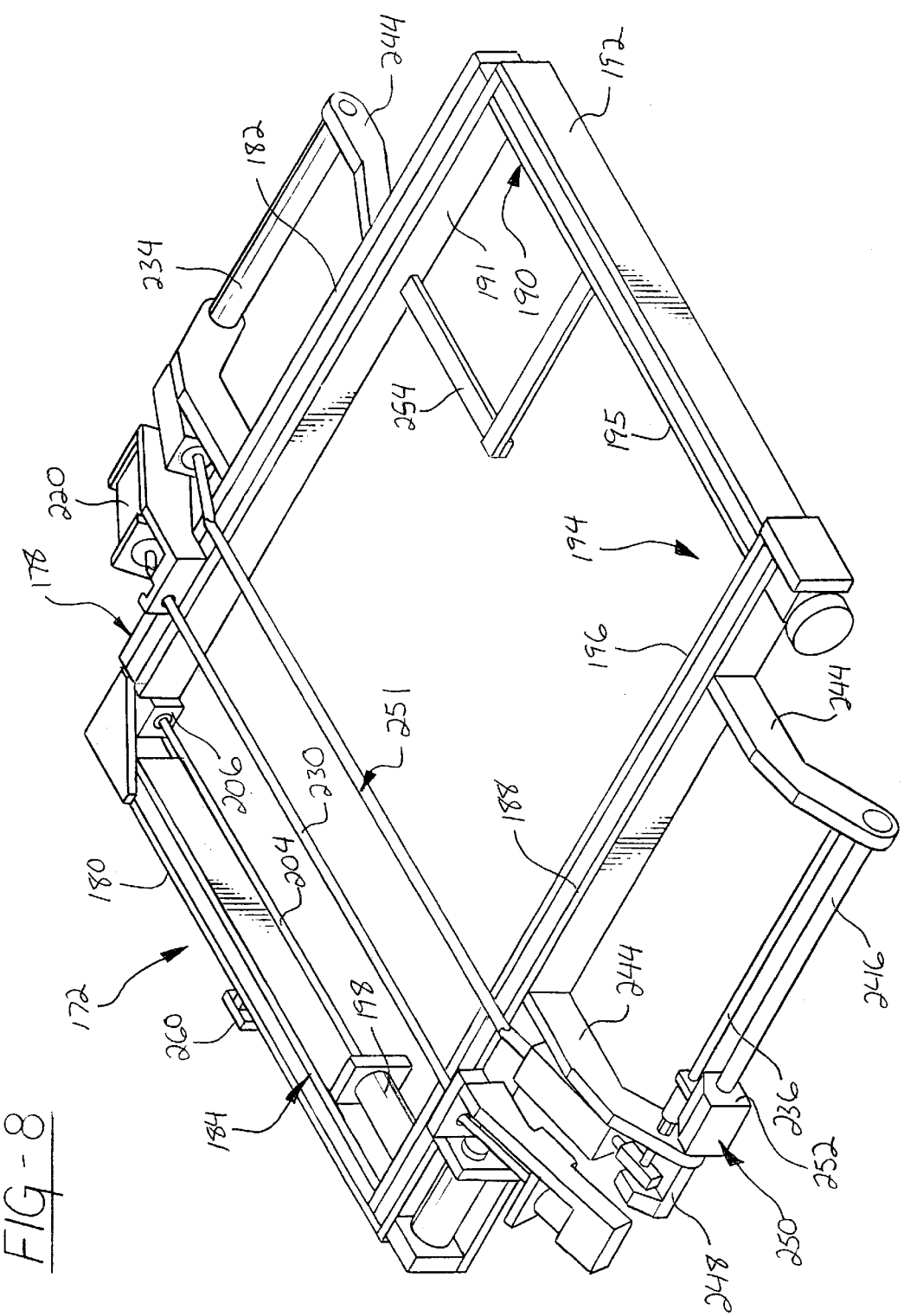

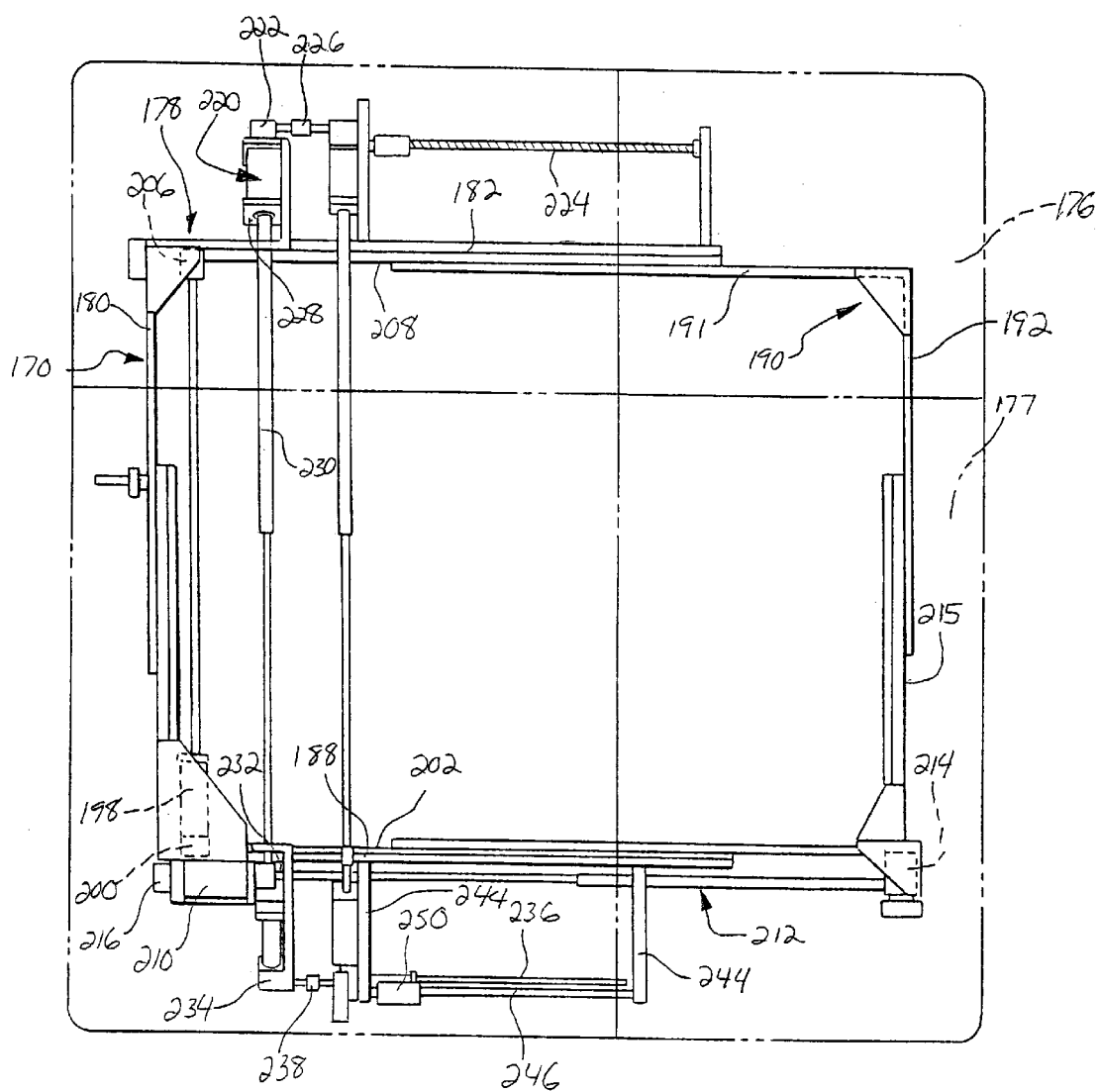

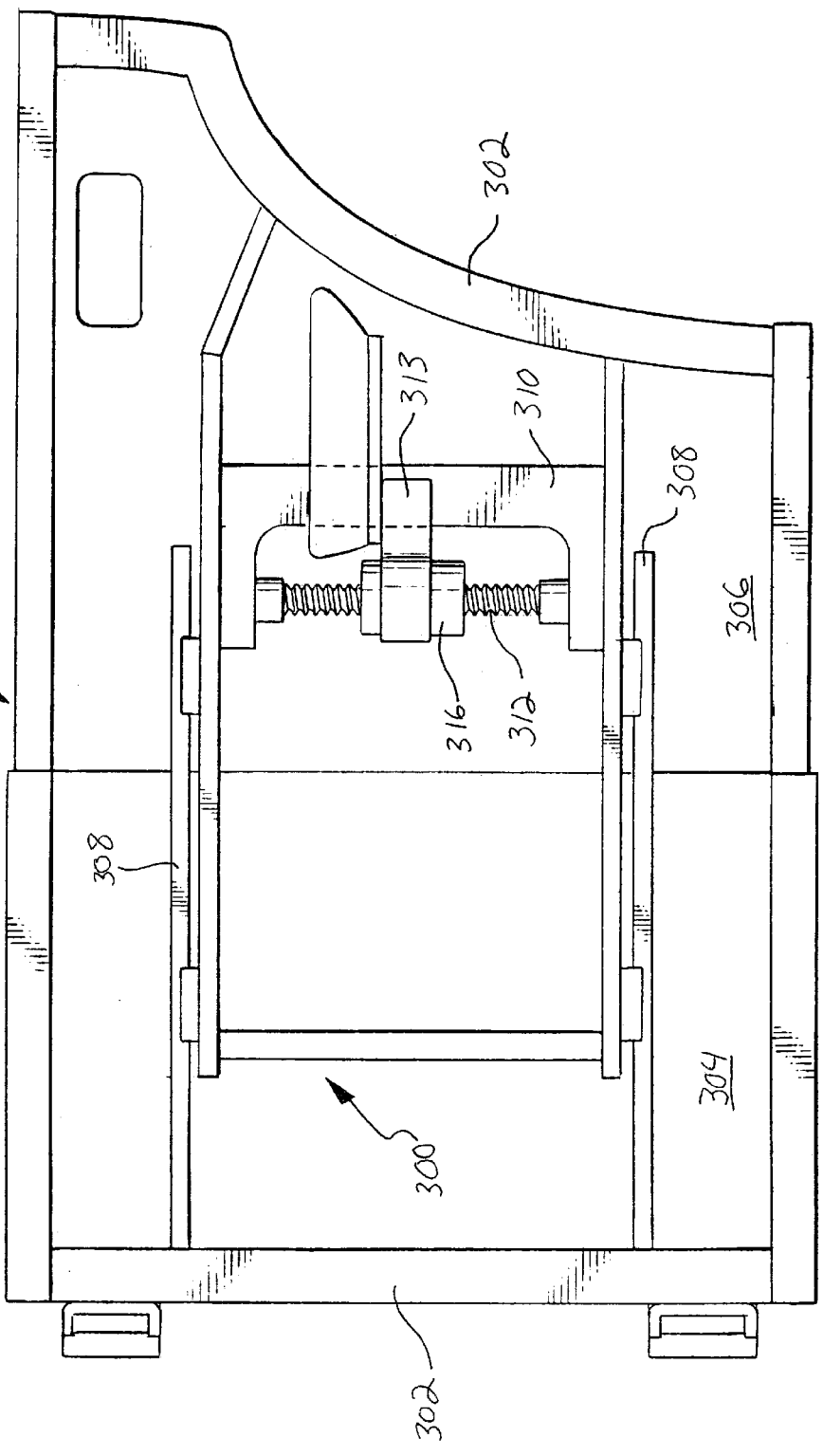

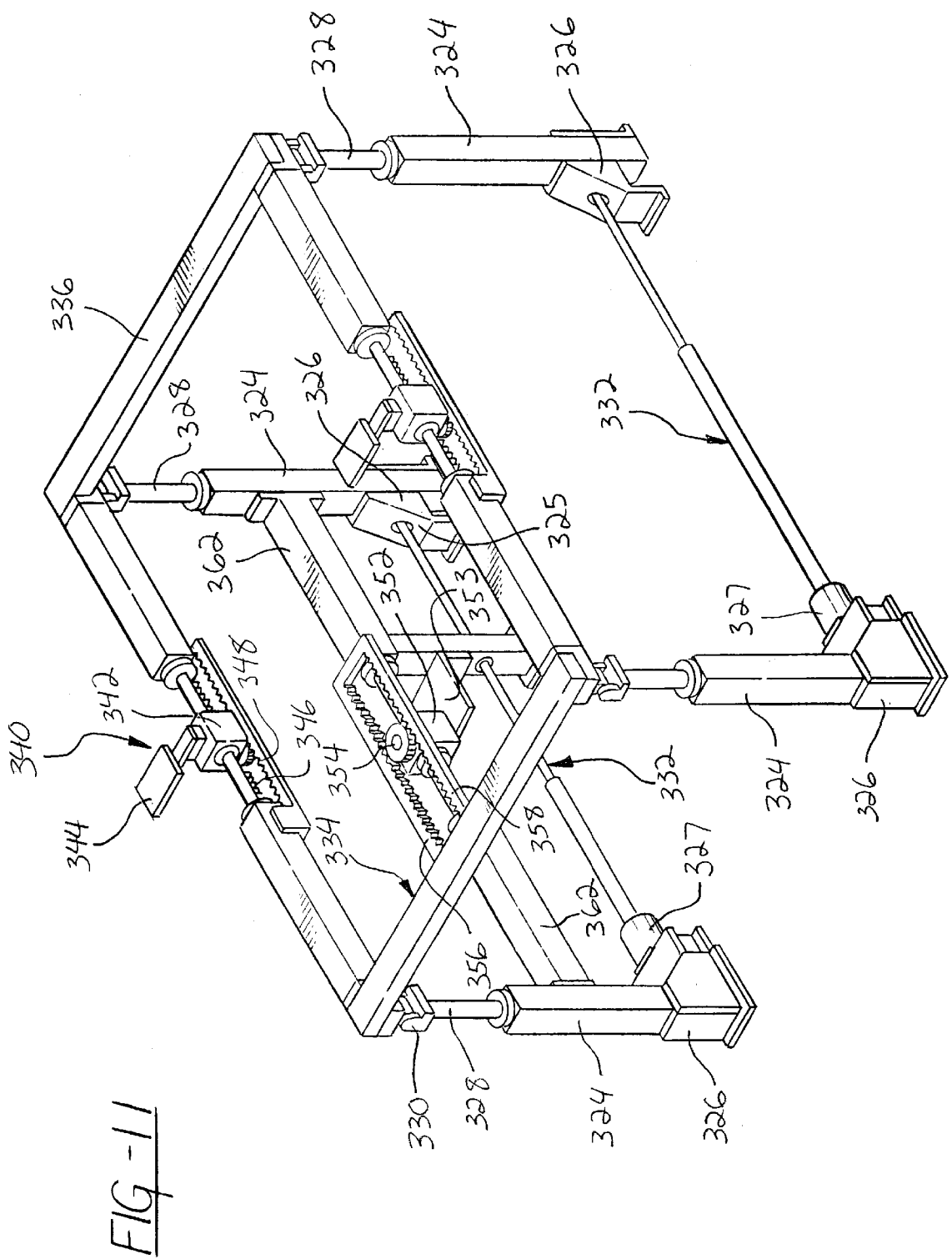

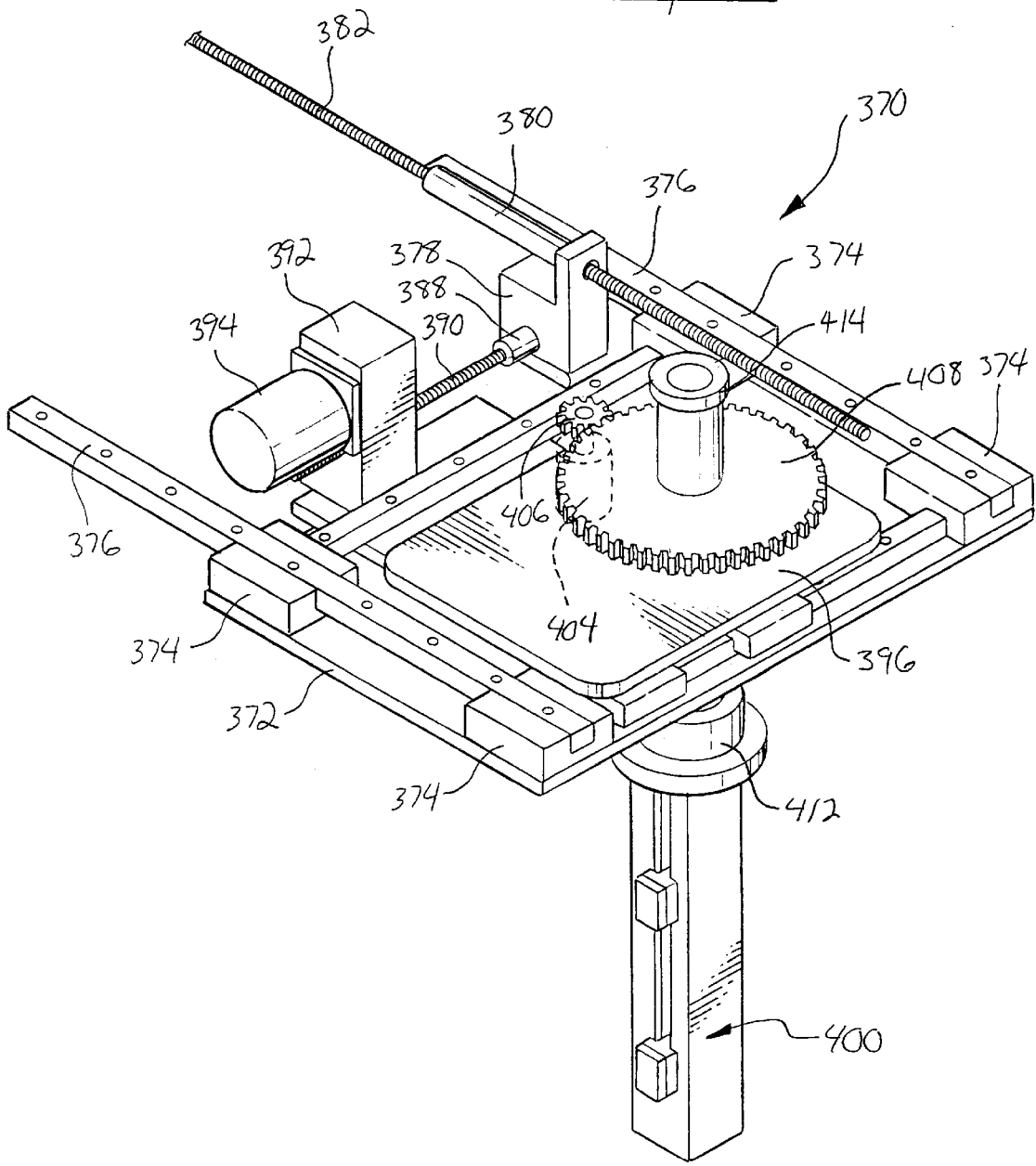

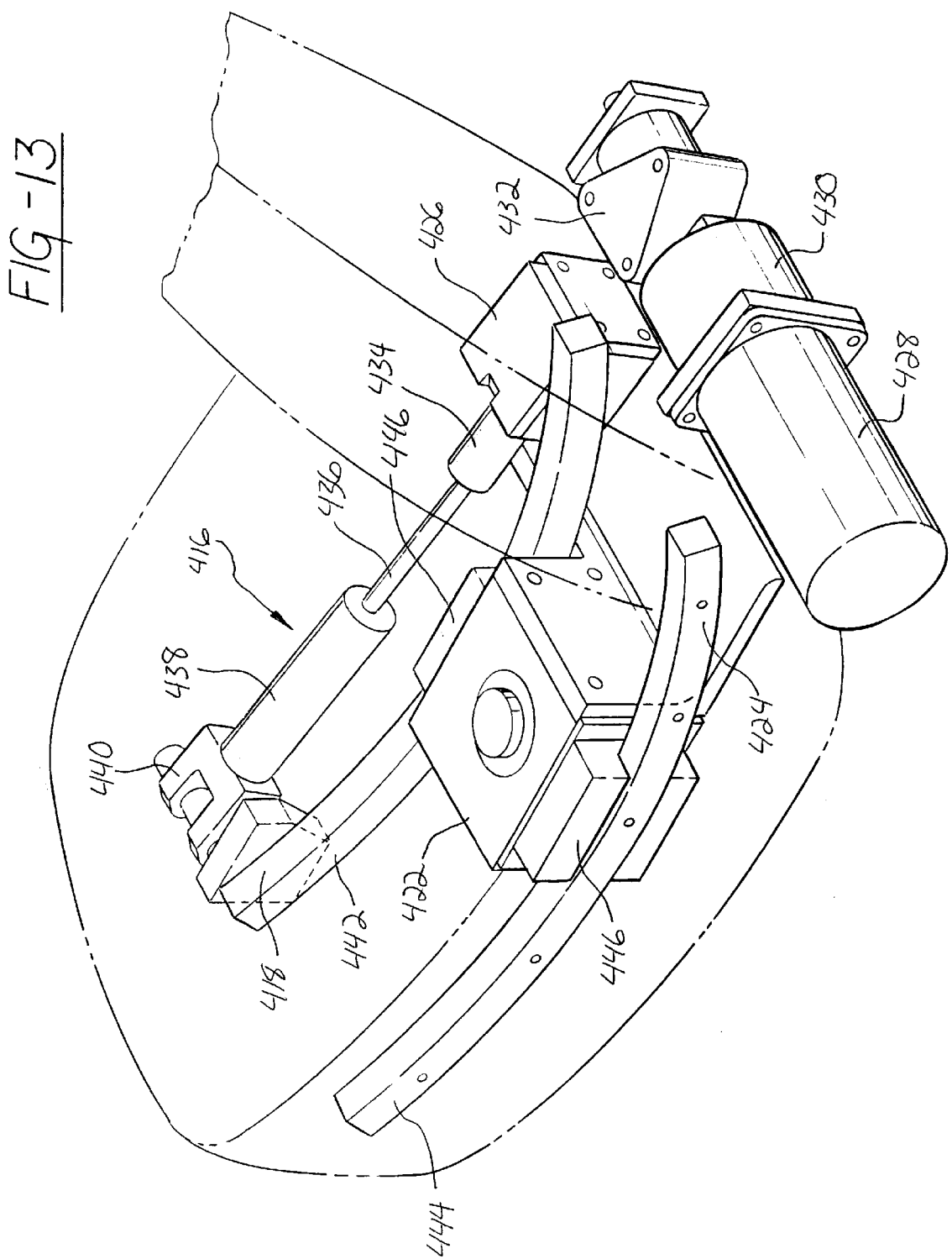

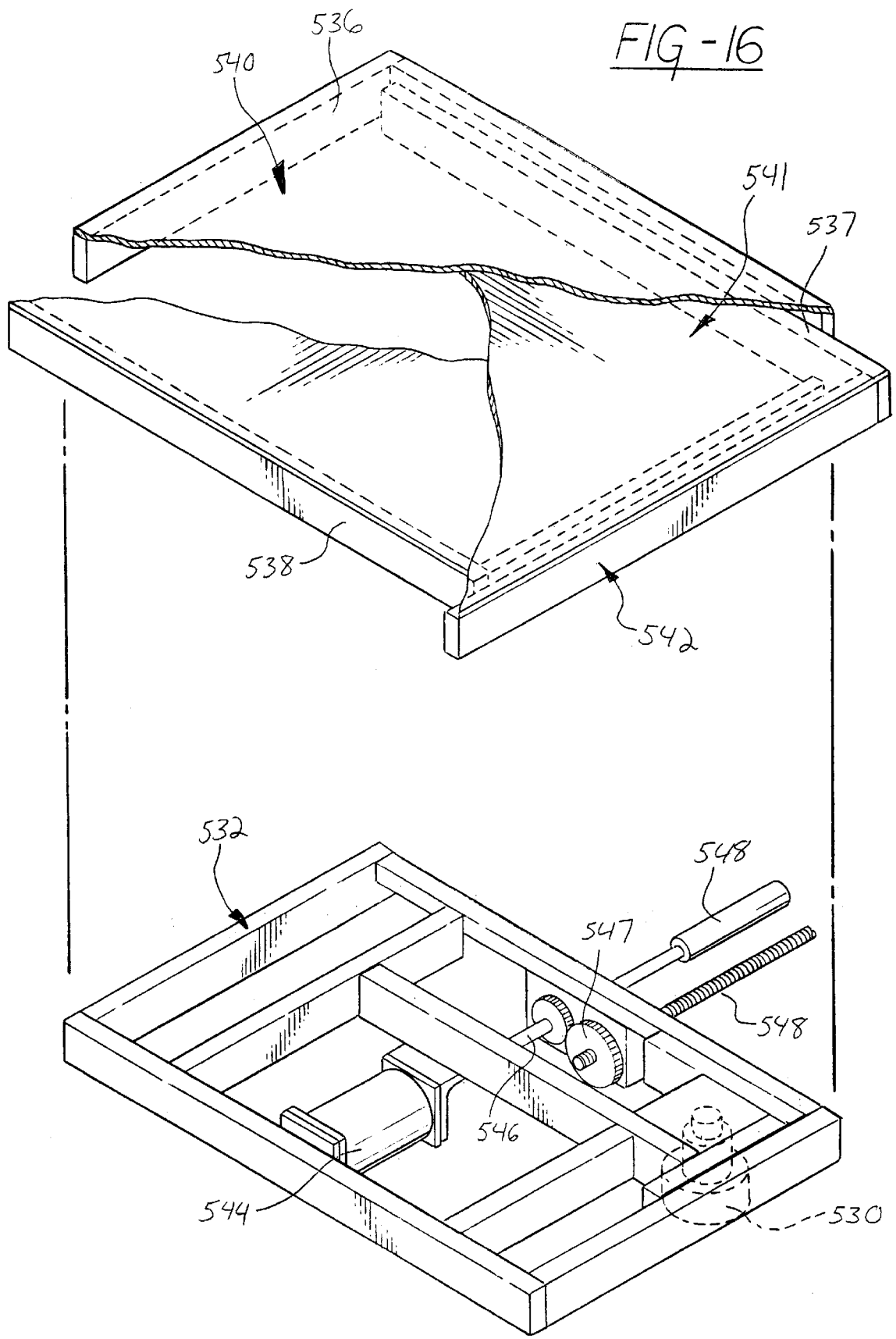

FIG - 24

| Axis | Name | Min. Pos. | Current Pos. | Max Pos. |
|---|---|---|---|---|
| 1 | Tumblehome | -3280.0 | -1720.0 | 6720.0 |
| 2 | Cross Car | -3430.0 | 1570.0 | 6570.0 |
| 3 | Roof height | -3275.0 | 1725.0 | 6725.0 |
| 4 | Front Clip Upper Grid | -2543.0 | 2457.0 | 7457.0 |
| 5 | Front Clip F/A | -2788.0 | 2212.0 | 7212.0 |
| 6 | Driver's Wheelwell F/A | -2765.0 | 2235.0 | 7235.0 |
| 8 | IP U/D | -3760.0 | 1240.0 | 51240.0 |
| 9 | IP F/A | -2857.0 | 2140.0 | 557698.0 |
| 10 | Steering column U/D | -4095.0 | 905.0 | 56460.0 |
| 11 | Steering column F/A | -2522.0 | 2478.0 | 52478.0 |
| 12 | Steering column C/C | -4677.0 | 323.0 | 5323.0 |
| 13 | BASE LIFT | -5000.0 | 0.0 | 5000.0 |
| 14 | Front floors F/A | -3202.0 | 1798.0 | 51789.0 |
| 15 | Front Seats F/A | -2349.0 | 2651.0 | 7651.0 |
| 16 | Front Floors U/D | -1415.0 | 555.0 | 5555.0 |
| 17 | Front Seats C/C | -4678.0 | 322.0 | 5322.0 |
| 18 | Front Seats U/D | -4176.0 | 824.0 | 5824.0 |
| 23 | Front Floors U/D | -4733.0 | 267.0 | 5276.0 |

Jog Selected Areas

[ + ] [ - ] [ Stop ]  [ Sort ] [ Save ] [ Exit ] [ Help ]

FIG - 25

Vehicle Initial Data Setup

| Show ID | Vehicle ID | Vehicle UD Grid | Vehicle FA Grid | InPos. |
|---|---|---|---|---|
| Compact | | 1135 | 2843 | |
| Compact | | 1140 | 2700 | |
| Compact | | 1200 | 2900 | |
| Compact | | 1209 | 3300 | |
| Compact | | 1100 | 2843 | |
| Compact | | 1235 | 2870 | |
| Compact | | 1400 | 2817 | |
| Compact | | 1320 | 2834 | |
| Compact | | 1135 | 2843 | |
| Compact SUV | | 1034 | 2800 | |
| Compact SUV | | 1370 | 3100 | |
| Compact SUV | | 1456 | 2900 | |
| Compact SUV | | 1436 | 2785 | |
| Compact SUV | | 1400 | 3900 | |
| Compact SUV | | 1400 | 3500 | |
| Compact SUV | | 1400 | 3900 | |
| Compact SUV | | 1420 | 3000 | |

[ Add ] [ Edit ] [ Delete ] [ Refresh ] [ Sort ] [ Help ] [ Exit ]

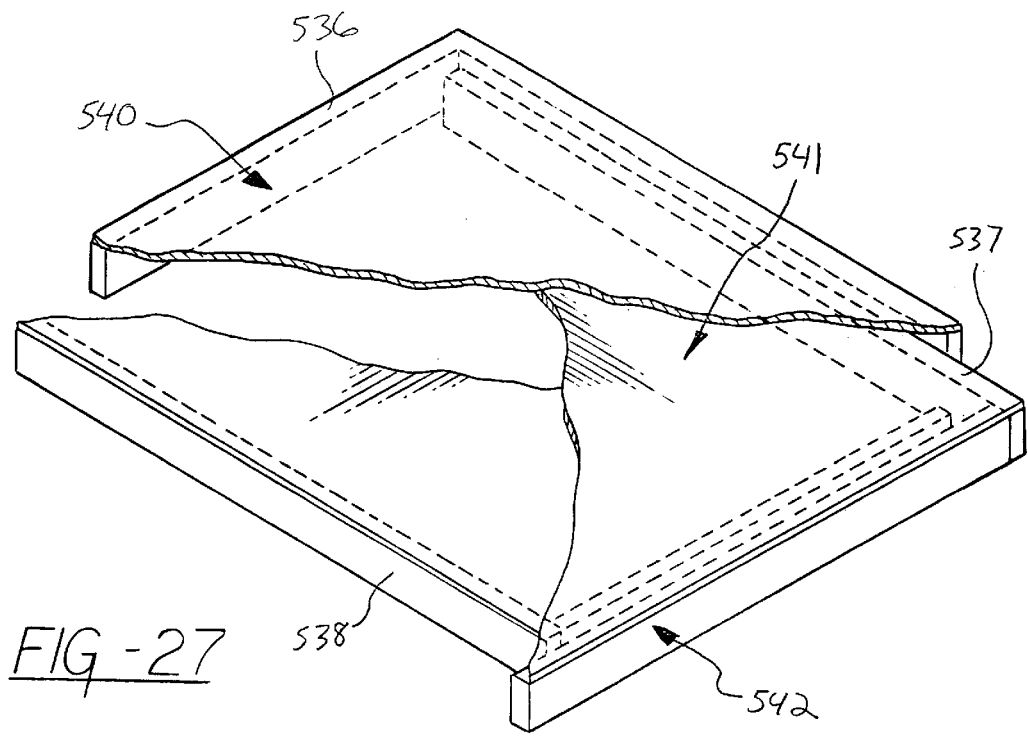
FIG-27
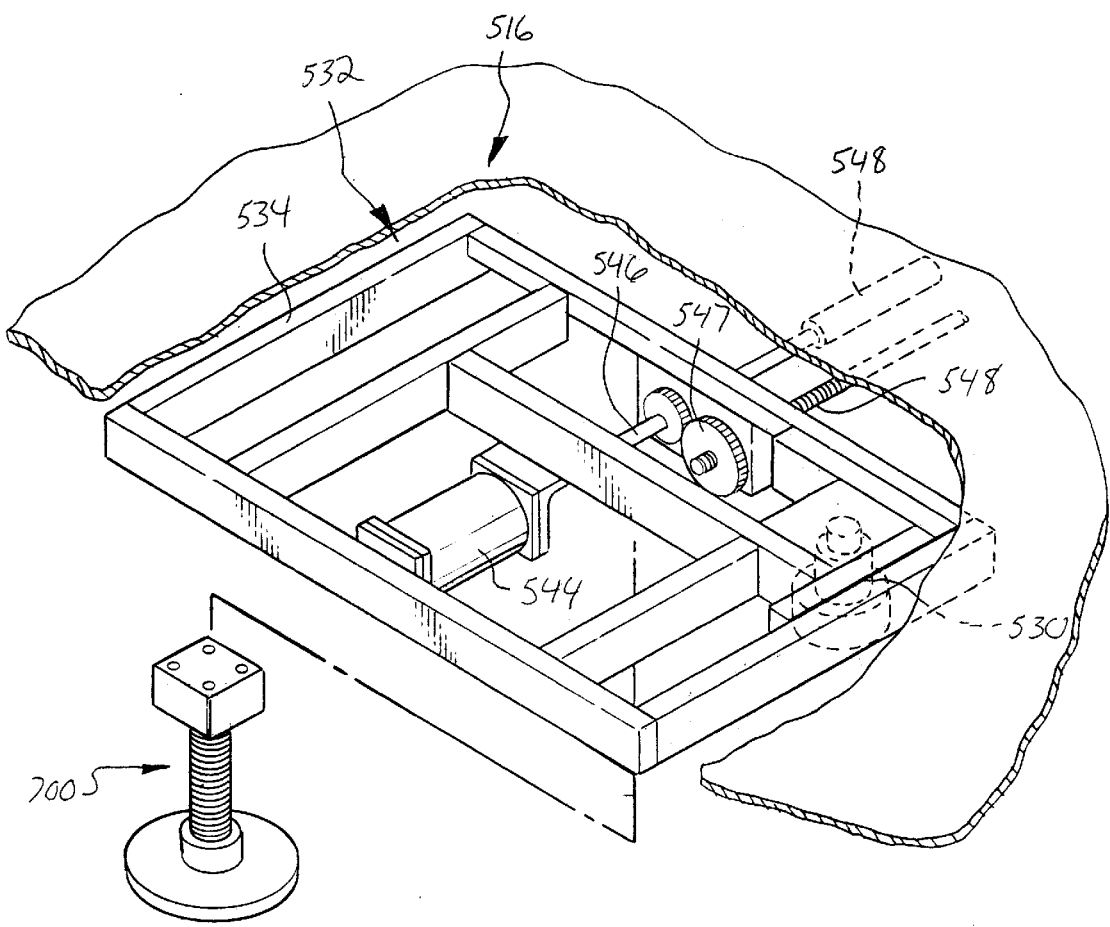

PROGRAMMABLE VEHICLE MODEL

CROSS-REFERENCE TO CO-PENDING PROVISIONAL APPLICATION

Applicants hereby claim the benefit of co-pending, Provisional Patent Application Serial No. 60/060,765 filed Oct. 2, 1997 in names of Brian C. Doll, Kurt D. Zeile, Thomas M. Sharples and John A. Fox, and entitled "Programmable Vehicle Model," the contents of which are incorporated herein in their entirety.

BACKGROUND OF THE INVENTION

Field of the Invention

The present invention relates, in general, to motor vehicles and, more specifically, to methods and apparatus for designing motor vehicles.

The design of automotive vehicles, such as automobiles, trucks, etc., usually begins with the development of various sketches and drawings showing the shape of the various body panels and other components of the vehicle. Three-dimensional clay models and, more recently, computer generated models, are then created to provide a visual image of the proposed vehicle design. Changes to the shape of the vehicle at this stage entail time consuming, highly skilled labor, even if such changes are on the order of only several millimeters in a particular dimension.

In order to design and market a successful vehicle, an accurate assessment of consumer needs, the market and the competition with regard to size and styling of a vehicle, among other factors, must be determined at an early stage of the vehicle design. Typically, models, known in the industry as "bucks", are constructed to simulate a particular body component or vehicle section, such as the interior passenger compartment of a vehicle, the exterior shell, trunk, engine compartment, undercarriage, etc. Such bucks are designed for a specific vehicle and any changes to the parts thereof require additional labor and time. Furthermore, a number of identical bucks or test stands are designed for each different vehicle model made by a particular manufacturer for use by various design and engineering personnel.

Ergonomics, or the interaction of the vehicle with the user, is becoming an important factor in the design of automotive vehicles. Ergonomics involves the spatial relationship of various components with each other and the user, such as the driver or passenger of a vehicle. In order to provide a comparison of various ergonomic factors, a number of different bucks would be designed, each having a different spacial relationship of components. Consumers sit in or view each buck and provide their opinions in response to detailed questions relating to various facets of each design. This information is utilized by the vehicle manufacturer to develop a new vehicle or to refine an existing vehicle.

In order to expedite the design of a vehicle and to adequately assess all of the ergonomic and other factors associated with the design of a vehicle, attempts have been made to provide universal bucks which are adjustable in size and shape so as to enable a number of different designs to be tested in a time efficient manner. One such attempt by some of the inventors of the present application resulted in the development of a computer controlled buck which incorporated a seat, steering column, instrument panel, gear shifter, floor pan and front and rear seats. Most of the above-named components were variably adjustable in position in up/down or fore/aft directions as well as being adjustably positionable laterally across the width of the test buck. While this buck was effective in evaluating various vehicle interior designs and spatial relationships, it did not incorporate any exterior body panels which would lend it to testing of entire vehicle shapes, both interior and exterior, as well as how such exterior body panels interact spatially with the internal vehicle components and/or passenger.

Certain of the Applicants then devised a programmable vehicle model, shown in U.S. Pat. No. 5,384,704, which includes the aforementioned adjustable components or assemblies mounted within a complete simulated vehicle including telescoping and expandable/retractable body panels to simulate the complete exterior body surface of a vehicle. While the programmable vehicle model has proven successful, it has been discovered that further enhancements could be made to it to provide greater versatility or adjustability of certain components to enable the position of certain components within a vehicle to variably adjusted to aid in the design process.

Thus, it would be desirable to provide a programmable vehicle model in the form of an entire full-size vehicle in which substantially all of the vehicle components are provided with enhanced adjustably in position with respect to each other to create different vehicle shapes and component spatial relationships. It would also be desirable to provide a dimensionally adjustable vehicle component for use on a stand alone, individual basis or as part of a vehicle subassembly to provide adjustability in position of various portions of the component with respect to each other and/or to adjacent components to create different components spatial relationships.

SUMMARY OF THE INVENTION

The present invention is a programmable vehicle model which includes vehicle components which are dimensionally adjustable in some or all of the up/down, fore/aft and cross car directions.

The programmable vehicle model includes a platform on which various panel support structures are mounted. A plurality of vehicle body panels are mounted on the support structures in a vehicle body position to simulate a full-size vehicle body. At least certain of the body panels and/or interior components are formed of a plurality of sections which are mounted in an overlapping, telescopingly adjustable positional relationship. A drive means, mounted on at least one of the panel or component sections, adjustably positions the sections with respect to each other at any selectable position to vary at least one of the height, width and length of the overall body panel or component position.

A control means executing a stored control program is provided for controlling the drive means to vary the position of the body panels and/or vehicle components.

A cross car carriage formed of a plurality of movable plates is mounted on the platform and is movable in a lateral direction by the control means to any desired position. A fore/aft carriage formed of another set of movable plates are slidably disposed on the cross car carriage plates to provide controlled fore/aft movement of various body components. Vertical displacement means are also provided for variably displacing certain body panels, such as the vehicle hood, roof, trunk, and certain components, such as the vehicle seats, floors, instrument panel, steering column, center console, and accelerator and brake pedals, in vertical or up and down directions. Horizontal displacement means are provided for variably displacing various body panels and components including the instrument panel, accelerator and/ or brake pedals, steering column, seats, front and rear floors, hood, trunk and roof panels and the center console along horizontal axes extending fore/aft and cross car or laterally along the vehicle.

An exterior body panel, such as a door, roof or hood, is formed of a plurality of telescopingly overlapping sections which are configured such that the plurality of sections of each body panel present a solid exterior surface regardless of their degree of overlap with respect to each other. This avoids any unsightly gaps between such body sections which would detract from the overall appearance of the vehicle.

In a preferred embodiment, the programmable vehicle model of the present invention includes a platform, and panel support means including first and second pairs of longitudinally spaced pillars, the pillars in each of the first and second pairs of pillars being laterally spaced on the platform, each of the first and second pairs of pillars being laterally and longitudinally movable relative to the platform. A plurality of vehicle body panels are mounted on the panel support means in vehicle body positions simulating a vehicle. First and second pairs of upper pillar members are each angularly and extensively mounted with respect to the first and second pairs of pillars, respectively.

A vehicle roof includes a first pair of frontmost roof frames, each carrying a frontmost roof panel, and a second pair of rearmost roof frames, each carrying one rearmost roof panel. The first and second pairs of frontmost and rearmost roof panels are disposed in a telescoping, overlapping, transverse and longitudinal arrangement to form an entire roof. Roof panel drive means are coupled to the first and second pairs of roof frames for transversely and longitudinally adjusting the position of the first and second pairs of roof frames with respect to each other to vary the perimeter dimensions of the entire roof.

Preferably, the roof includes means for longitudinally adjusting the position of the entire roof as a unit with respect to the second pair of pillars. The position adjusting means preferably comprises a pair of supports, one support coupled to each opposed side of one of the first and second pairs of roof frames. A bracket is movable on each support and connected to one of the second pillars. Drive means are carried on one of the supports and coupled to the bracket for longitudinally adjusting the position of each bracket with respect to one second pillar.

An anti-sway mechanism is incorporated into the vehicle roof structure and is formed of first and second supports carried on opposed sides of one of the frontmost and rearmost pairs of roof panel frames. A link is pivotally connected to each of the first and second supports and arranged for complimentary rotation with an opposed link. A slider is pivotally connected to each link and is movably mounted in a block. A drive nut carried in the block and coupled to the slider threadingly receives a threaded screw. A universal joint is connected to outer ends of each of first and second telescopingly extendable shafts and coupled to one threaded shaft. A gear is coupled to one of the universal joints and to one of the threaded shafts for reversing the direction of rotation of the one shafts for identical directional rotation of both of the shafts.

A centering device is provided to maintain a rearview mirror centered along the longitudinal axis of the vehicle despite any lateral width changes in the vehicle. In a preferred embodiment, the mirror centering means includes a bracket slidably mounted on one of the frontmost roof frames and carrying a mirror. A pair of racks are carried on adjacent surfaces of each of frontmost roof frames and engaged by a gear carried on the bracket upon lateral movement of the racks to maintain the bracket and the mirror carried on the bracket in a normal, unmoved centered position relative to the vehicle.

In another embodiment suited for use in a complete vehicle model or in a regular vehicle or in a stand alone buck, the programmable vehicle model includes a base, a first plate, means coupled between the first plate and the base for longitudinally moving the first plate relative to the base, a second plate, means coupled to the second plate for laterally moving the second plate relative to the first plate, vertical elevatable means coupled to the second plate for vertically elevating the second plate, a mount carried on the vertical elevatable means, and seat mounting pads disposed on the mount for attachment to a seat. Preferably, the seat mounting pads disposed on at least one track slidably carried on the mount. Drive means are coupled to the one track for sliding the one track with respect to the mount to change the orientation of a seat mounted on the seat mounting pads with respect to the base. The one track is preferably curved to provide a change in the angle or tilt of the seat.

In another embodiment, the programmable vehicle model includes a base, vertical elevatable means mounted on the base, drive means for elevating the vertical elevatable means, a first floor frame mounted on the vertical elevatable means, a first floor plate fixed on the first floor frame, a plurality of second frames slidably coupled to the first floor frame, with a second plate mounted on each second frame and arranged in telescopingly overlapping arrangement with the first floor plate to form a solid floor surface. The first floor frame and the plurality of second floor frames are laterally and longitudinally adjustable with respect to each other.

In a stand alone or vehicle model embodiment, the vehicle component is an adjustable toe plate formed of a base, a first floor frame carried on the base and carrying a floor panel, a toe plate angularly disposed with respect to the floor frame, and means, coupled between the floor frame and the toe plate for adjusting the longitudinal position of the toe plate relative to the floor frame.

As part of or separate from the adjustable toe plate, the programmable vehicle model also includes a dimensionally adjustable simulated wheel well formed of a housing disposed adjacent to the toe plate, and means coupled between the housing and first floor frame for independently moving the housing longitudinally with respect to the first floor frame and the toe plate.

In another embodiment, the programmable vehicle model includes a multi-dimensionally adjustable accelerator, brake and/or clutch pedal mechanism formed of a base mounted on a platform, an accelerator pedal support means carried on the base for supporting an accelerator pedal, a brake pedal support means carried on the base for supporting a brake pedal, means for moving the accelerator and the brake pedal support means laterally as a unit relative to the platform, and means for selectively laterally spacing the brake pedal support means from the accelerator pedal support means.

Preferably, a first slider is mounted on the base and carries the accelerator pedal support means and the brake pedal support means. Drive means are coupled to the first slider for laterally moving the first slider relative to the base.

Further, a second slider is carried on the first slider and directly carries the brake pedal support means for longitudinally varying the position of the brake pedal support means with respective to the accelerator pedal support means. Drive means are coupled to the second slider for moving the second slider independent from movement of the first slider.

A first track is slidably mounted on the accelerator pedal support means and carries the accelerator pedal on one end. Resistance means are coupled between the accelerator pedal support means and the first track for biasing the one end of the first track and the accelerator pedal outward from the accelerator pedal support means to a foot engagement position and for providing a slight resistance against movement of the first track and the accelerator pedal in an opposed direction.

A second track is slidably mounted on the brake pedal support means and has the brake pedal mounted on one end. Resistance means are coupled between the brake pedal support means and the second track for biasing the one end of the second track and the brake pedal outward from the brake pedal support means to a foot engagement position and for providing a slight resistance against movement of the second track and the brake pedal in an opposed direction.

A clutch pedal may optionally be mounted on a separate biased track carried on the second slider with the brake pedal support means.

An encoder is coupled to at least some and, preferably, all of the lead screws or drive shafts associated with a drive motor on each dimensionally adjustable vehicle component. The encoder provides output pulses to a controller which determines the actual position information of the component driven by the lead screw within the overall coordinate grid system of the programmable vehicle model or stand alone vehicle component.

According to other aspects of the programmable vehicle model of the present invention, a carriage or platform is provided for carrying all of the component support structure. The carriage includes at least one and preferably a pair of recesses at opposite longitudinal ends of the carriage which are suited for receiving the control circuitry and the controller used to control the various drive means or motors employed to dimensionally adjust the various components of the programmable vehicle model.

A plurality of vertically adjustable jack screws located at diagonally opposed portions of the platform provide leveling and control of the vertical height of the platform in a vehicle coordinate grid measurement system. A single drive source formed of a motor and a plurality of drive shafts are mounted on the platform and connected to gears engageable with the jack screws to directionally control the elevation of the leveling pad of each jack screw relative to an underlying floor surface.

According to another aspect of the present invention, the front roof elevatable means or upper pillar, mounted in the A pillar, is provided with a 360° universal joint which allows the front windshield headers surrounding the front roof elevatable means extending above the A pillar to be rotatable over a 360° arc so as to accommodate any roof panel width and length dimension as well as any longitudinal fore/aft position of the entire roof with respect to the underlying vehicle.

According to another aspect of the present invention, an uniquely adjustable instrument panel and steering column are provided with lateral and longitudinal movement as a unit and independent of each other. The unique steering column is also capable of adjustable telescoping movement relative to the instrument panel and vertical up/down or angular repositioning with respect to the instrument panel.

In another embodiment, the programmable vehicle model includes a dimensionally adjustable center console with a separately elevatable armrest. The console carries the armrest at one end such that the console and armrest are both vertically and longitudinally adjustable as a unit with respect to an underlying support surface or base in the programmable vehicle model.

A gear shifter is fixedly mounted on the console forward of the armrest. The forward portion of the console and the gear shifter are longitudinally adjustable to a selected dimensional position. A separate drive means provides independent longitudinal adjustment of the armrest rearward of the gear shifter and the front portion of the console. The armrest is also vertically adjustable independent from the front portion of the console to enable the horizontal and vertical spacing between the gear shifter and the armrest to be adjustably varied.

Finally, the programmable vehicle model includes a three part front deck lid and a three part rear deck lid, each formed of two outer panels and a center fixed panel which overlays the inboard ends of the outer panels. The entire front deck lid and the rear deck lid are independently globally adjustable in vertical, lateral and longitudinal directions. An upper centering mechanism maintains the center panel of the front and/or rear deck lid centered on the longitudinal axis of the vehicle model despite any lateral repositioning of the outboard front and rear deck lid panels during lateral adjustment of the vehicle model. A lower centering mechanism is mounted on the front and rear deck lid support structure for maintaining a center portion of a three part front and/or rear facia or bumper fixed relative to two laterally moveable outer facia portions. The outer portions of the front or rear facia move laterally with the corresponding outer ends of the front or rear deck lid.

Certain of the individual vehicle component mechanisms described above may also be provided in a stand alone device or in so-called "buck," either individually or in combination with other dimensionally adjustable components of the present invention. For example, the dimensionally adjustable seat of the present invention may be employed in a conventional vehicle by mounting the dimensionally adjustable seat to a base either secured to the vehicle or extending through an opening in the floor pan of the vehicle. Likewise, the adjustable floor may be employed in a conventional vehicle or a partial simulated vehicle, either individually and/or in combination with the seat or the adjustable wheel well and the toe plate.

Further, the dimensionally adjustable accelerator, brake and/or clutch pedal mechanism may also be employed by itself or in combination with any or all of the dimensionally adjustable seat, floor and toe plate mechanisms of the present invention.

BRIEF DESCRIPTION OF THE DRAWING

The various features, advantages and other uses of the present invention will become more apparent by referring to the following detailed description and drawing in which:

FIG. 6 is a side elevational view of the A pillar roof displacement means;

FIG. 7 is a side elevational view of the B pillar roof displacement means;

FIG. 8 is a perspective view of the roof of the programmable vehicle model depicted in a completely retracted position;

FIG. 9A is a plan view depicting the roof shown in FIG. 8 in a partially expanded position;

FIG. 10 is a side elevational view of a typical door employed in the programmable vehicle model shown in FIG. 1;

FIG. 11 is a perspective view showing the hood tilt mechanism of the programmable vehicle model;

FIG. 12 is a perspective view of a seat support frame;

FIG. 13 is a perspective view of a seat tilt adjustment mechanism mounted on the seat frame of FIG. 12;

FIG. 16 is an exploded, perspective view of a typical floor panel adjustment mechanism of the programmable vehicle model;

FIGS. 24 and 25 are display screen menus used in the operation of the programmable vehicle model;

FIG. 27 is a partial, perspective view showing the mounting of a floor frame in the present invention in an actual vehicle;

DESCRIPTION OF THE PREFERRED EMBODIMENTS

Figure 1:
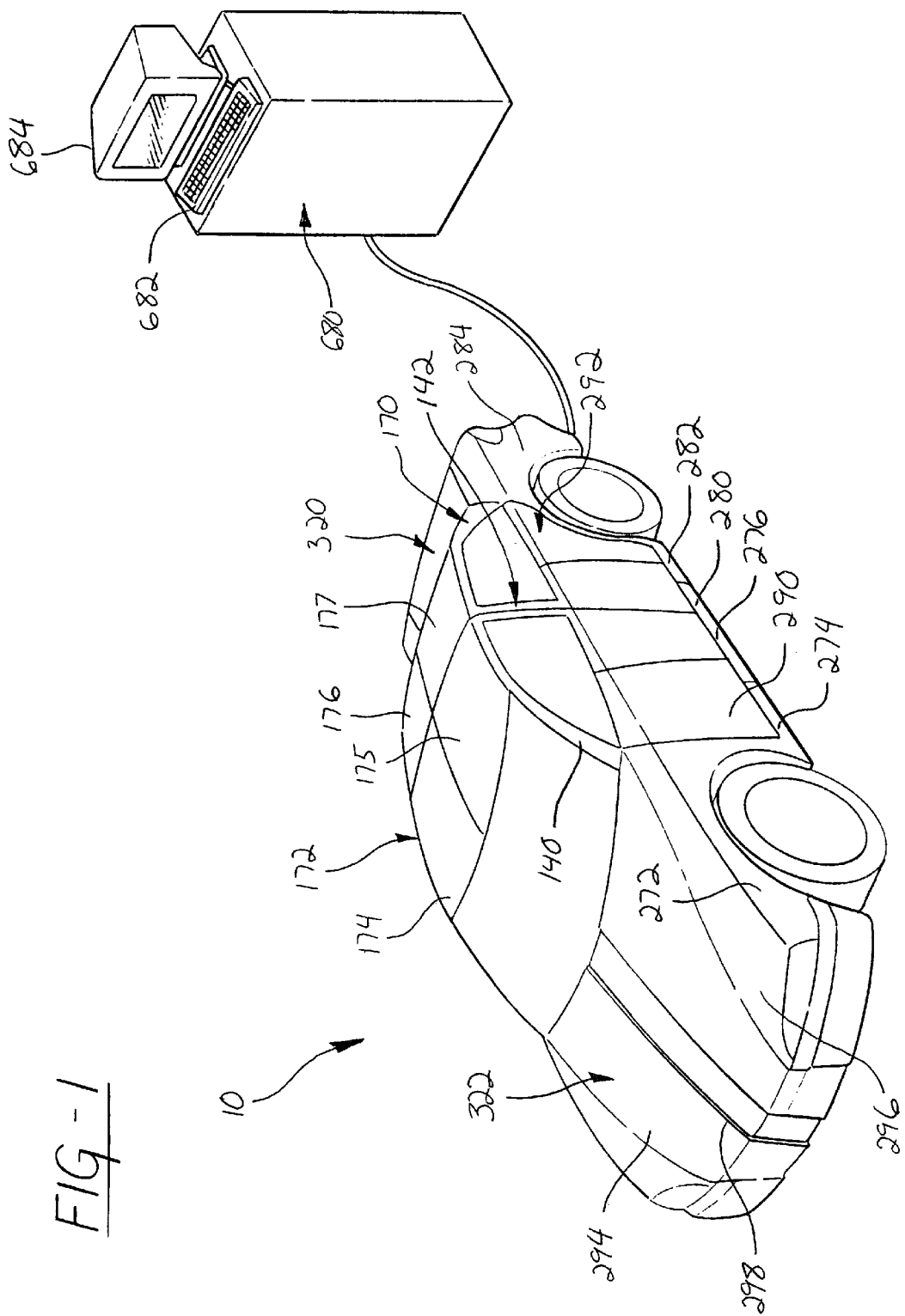
FIG. 1 is a pictorial representation of a programmable vehicle model according to the present invention.

Referring now to the drawing, and to FIG. 1 in particular, there is illustrated a programmable vehicle model 10 which is capable of assuming a practically infinite number of dimensional positions so as to simulate any desired vehicle exterior and interior size and/or component positional configuration.

Generally, the programmable vehicle model includes a platform, internal support structure or skeleton, movable exterior vehicle body panels and a control means which controls the operation of various electrical drive motors mounted internally within the programmable vehicle model to move the various vehicle components to any selected dimensional position.

Figure 2:
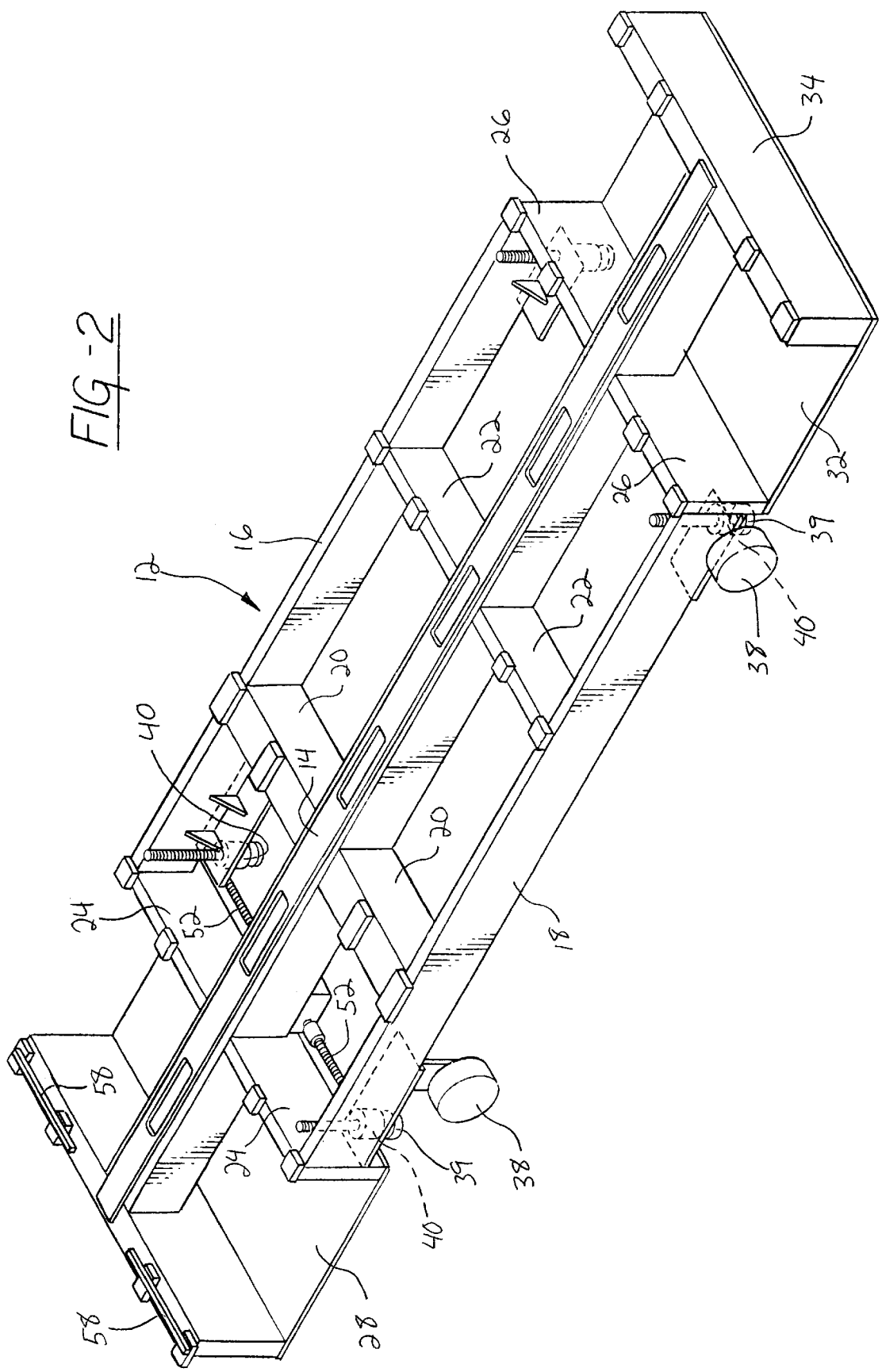
FIG. 2 is a perspective view of the platform of the programmable vehicle model shown in FIG. 1.

The platform 12, as shown in FIG. 2, is formed of a plurality of interconnected steel tubular members including a center tubular member or spine 14, and a pair of outer side members 16 and 18. A pairs of central cross-supports 20 and 22 extend between and are affixed to the tubular member 14 and each of the outer side members 16 and 18. Front walls 24 and rear walls 26 are joined to opposite ends of the tubular members, 16 and 18, with the outer ends of the center spine or tubular member 14 extending beyond the front walls 24 and the rear walls 26. A bottom wall member 28 extends from a lower edge of the front wall 24 to an outer front end 30. The bottom wall 28, the spaced front wall 24 and front end 30 define a pair of recessed cavities on opposite sides at the end of the center tubular member 14 which are adapted for receiving control circuits and other electrical connections used for the various electrical devices employed on the programmable vehicle model 10.

Similarly, a rear bottom wall 32 projects from the bottom edge of the rear wall 26 to a rear end 30. The rear bottom wall 32 in conjunction with the rear wall 26 and the rear end 30 also define a pair of cavities at the rear end of the platform 12 which receive additional electrical circuits and electrical connections, not shown.

A plurality of casters 38 are connected in spaced pairs to each of the outer side tubular members 16 and 18 to provide moveability for the platform 12. Leveling pads 39, mounted on electrically actuated jack screws 40 are mounted adjacent to each caster 38. The jack screws 40 provide for elevation of the entire platform 12 at a predetermined height above an underlying floor surface. Preferably, the jack screws 40 comprise Duff Norton jack screws, by example. Typically, the leveling pads 39 attached to the outer ends of each of the jack screws 40 will engage the floor with the jack screws 40 elevated to a height sufficient to raise the casters 38 out of contact with the floor.

A single drive source formed of a motor 42 having opposed outwardly extending drive shafts 44 and 46 is mounted in the platform below or in the center tubular member 14, as shown in FIG. 2. Each of the drive shafts 44 and 46 are each connected at an opposite end to a three way gear box 48 and 50, respectively. A pair of drive shafts 52 extend oppositely from the gear box 48 and a pair of drive shafts 54 extend oppositely from the gear box 50. Each of the drive shafts 52 and 54 terminates in a worm gear which engages the threaded shaft of each jack screw 40 to control bi-directional rotation of the threaded shaft and thereby elevation of the leveling pad 39 of each jack screw 40 relative to an underlying floor surface.

Figure 3:
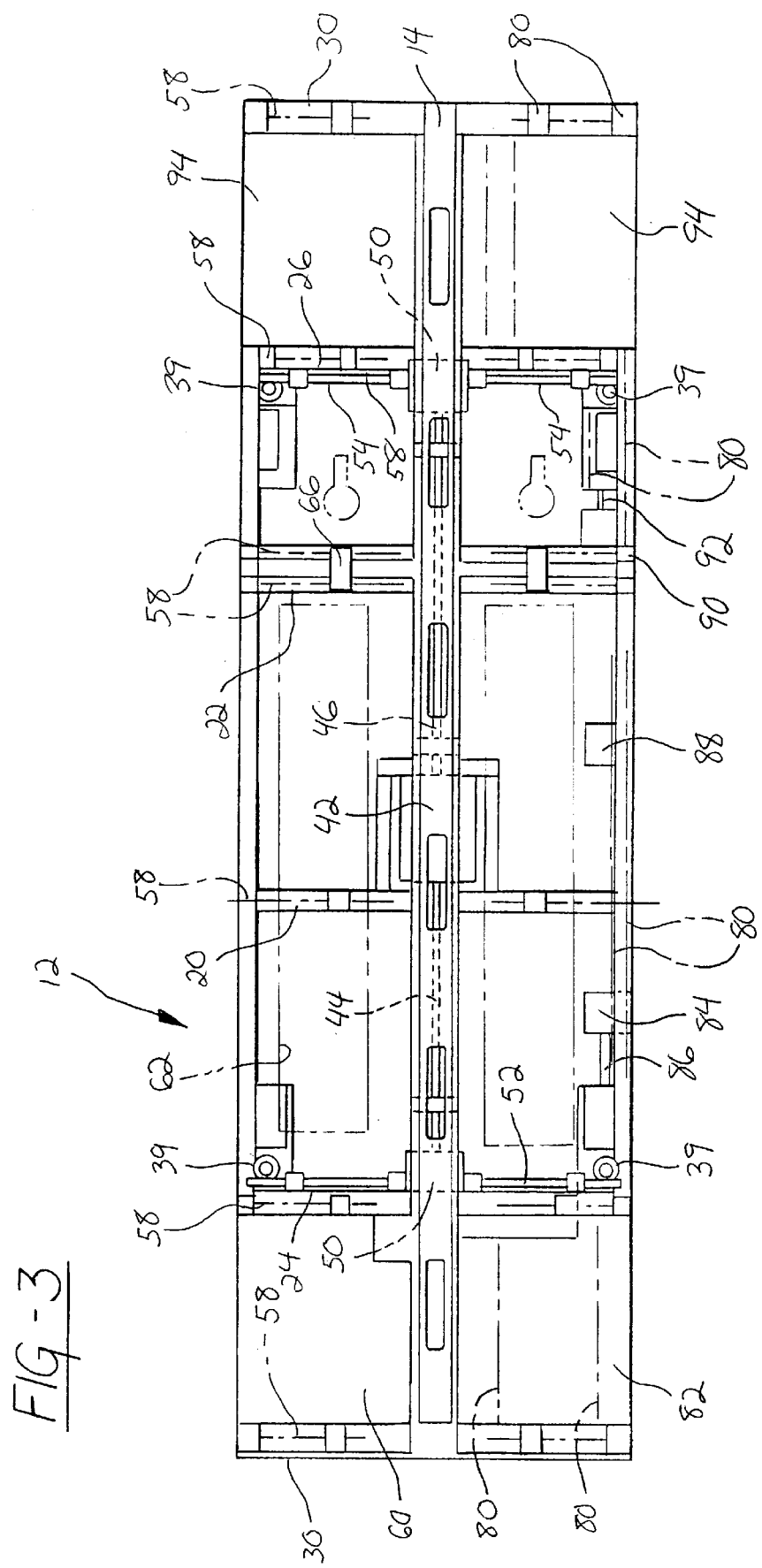
FIG. 3 is a plan view of the cross car and fore/aft carriages of the programmable vehicle model of FIG. 1.

A plurality of linear bearings, each denoted by reference number 58, with only one half of each linear bearing being depicted, are mounted on pads on the platform 12 as shown in FIG. 3. The other half or portion of each linear bearing 58 is mounted on the underside of the cross-car plates described hereafter. Each of the bearings 58 is fixedly mounted on pads secured to and spaced along the front end 30, the front wall 24, at spaced intervals along the length of the tubular member 16 and 18, on the side supports 20 and 22, the rear wall 26 and the rear end 34. The linear bearings 58 are generally arranged in co-axial pairs on opposite sides of the central tubular member 14.

Referring now to FIG. 3 there is depicted a right hand cross-car plate assembly it being understood that an identical left hand cross assembly is also mounted on the platform 12 via the linear bearings 58.

The right hand cross-car assembly includes a first cross-car plate 60 having a generally rectangular form and supporting on a linear bearing 58 on the front end 30 to another linear bearing 58 mounted on the rear most cross-support 22. An internal cut-out or aperture 62 is formed in the first cross-car plate 60. A second cross-car plate 64 is mounted rearward of the first cross-car plate 60 on the platform 12 and is also supported at opposite ends by linear bearings 58 attached to the underside of the second cross-car plate 64 and supported on the rear most cross support 22, the rear wall 26 and the rear end 34.

As also shown in FIG. 3, the first and second cross-car plates 60 and 64 are fixedly joined together by means of a tie plate 66. The tie plate 66 ensures that the front cross-car plate 60 and second cross-car plate 64 move laterally in unison across the width of the platform 12.

Generally, the left hand and right hand cross car plate assemblies are spaced apart on opposite sides of the central tubular member 14. The left hand and right hand cross-car plate assemblies, each formed of the first and second cross-car plate 60 and 64 are movable laterally across the width of the platform 12 to provide selective variation in the cross-car or lateral position of various components of the programmable vehicle model 12.

The first cross-car plate 60 of the left hand and right hand cross-car plate assemblies as well as the second cross-car plate 64 of each of the left hand and right hand cross-car assemblies are moved simultaneously laterally in equal amounts with respect to the central tubular member 14 to vary the overall width of the programmable vehicle model 10 and the width of various adjustable components mounted thereon.

Figure 4:
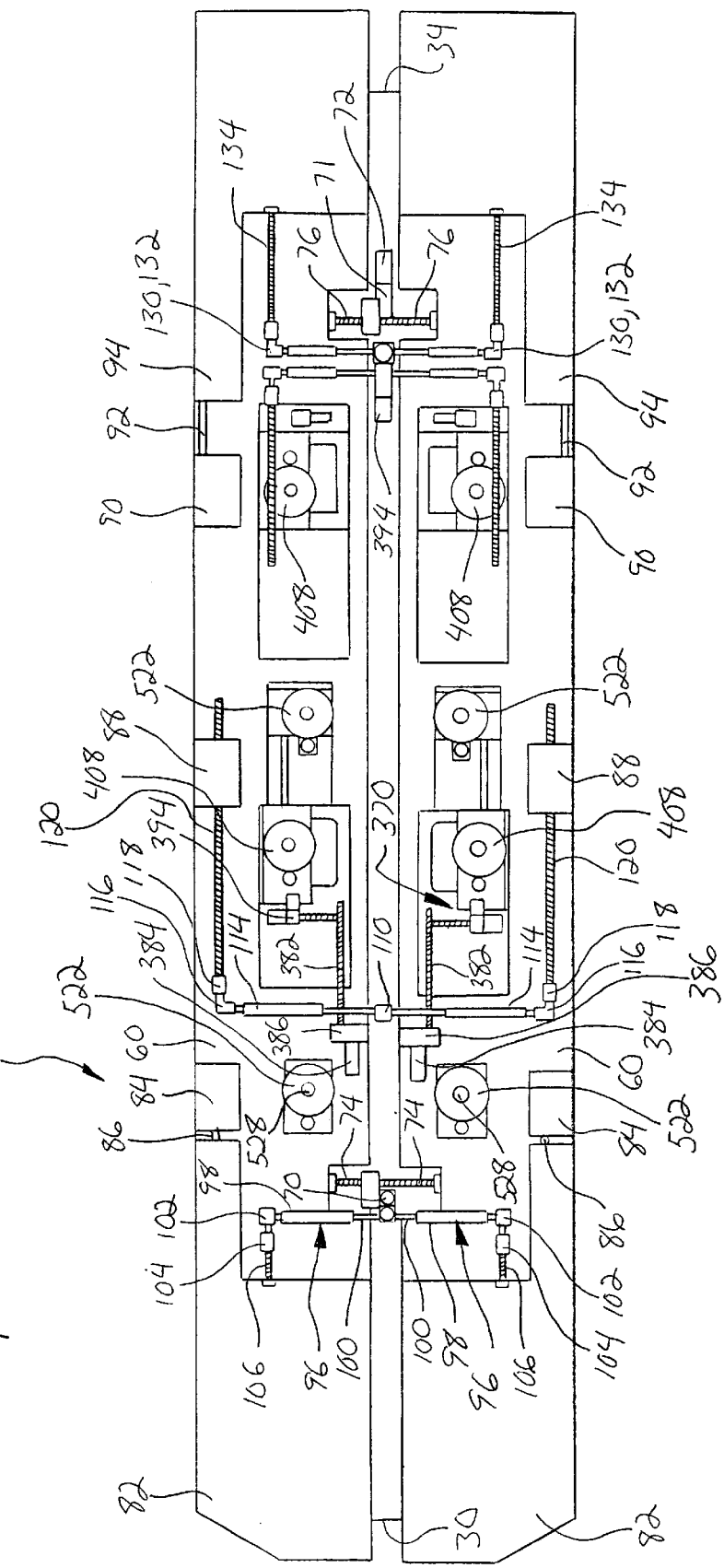
FIG. 4 is a plan view of certain of the fore/aft, cross car and seat displacement drives of the programmable vehicle model.

A cross-car horizontal displacement or drive means includes a front cross-car drive means or motor 70 and a rear cross-car drive means or motor 72 shown in FIG. 4. Each of the front rear drive motors 70 and 72 has an output shaft coupled to a gear box 71 which drives a pair of oppositely extending shafts each denoted by reference number 74 for the front drive motor 70 and by reference number 76 for the rear drive motor 72. Each of the shafts 74 and 76 comprises a ball or lead screw which engages a threaded drive nut fixedly mounted in a flange depending from an inner edge of one of the first or second cross-plates 60 and 64 as shown in FIG. 4. In this manner, bi-directional rotation of the shafts 74 and 76 by the front and rear drive motor 70 and 72 causes the lead screws or shafts 74 and 76 to rotate thereby moving the associated drive nut along the length of each lead screw to move the cross-car plate 60 or 64 which carries the drive nut in a lateral direction depending upon the directional rotation of the shafts 74 and 76. It should be noted that the front drive motor 70 and rear drive motor 72 are operated in unison so as to laterally reposition the first cross-plates 60 and the second cross-plates 64 at the same lateral spacing.

Further, each front rear drive motor 70 and 72, as well as most of the other motors described hereafter, includes an electrically operable friction brake coupled with each motor output shaft. For example, the friction brake can be one sold by Carlyle Johnson, Model FSES-001 or 002. The brake is activated by a control means, as described hereafter, to positively lock each motor output shaft in a fixed position when the motor is de-energized or when power is removed from the control means.

A plurality of fore/aft moveable plates are slidably mounted on linear bearings carried on the first and second cross-car plates 60 and 64 of the left hand and right hand cross-car plate assembly and cooperating portions formed on each of the fore/aft moveable plates. Such linear bearings are denoted by reference number 80 in the various drawing figures.

The fore/aft moveable plates are symmetrical about the longitudinal center line of the platform 12. Thus, only the left hand fore/aft plates will be described in detail; it being understood that similar plates are provided on the right hand fore/aft portion of the platform 12 and interconnected to the various fore/aft drive means described hereafter.

A generally L-shaped front clip 82 is slidably mounted for longitudinal fore/aft movement with respect to a forward end of the first cross-car plate 60. A separate pad or plate 84 carrying the A pillar is also slidably mounted on bearing 80 disposed between the plate 84 and the first cross-car plate 60 and is tied or fixed to the front clip 82 by means of a drawbar 86.

A separately moveable plate 88 is slidably mounted on the first cross-car plate 60 and carries the B pillar, described hereafter, for longitudinal movement along the first cross-plate 60.

A C pillar mounting plate 90 is also slidably mounted on bearings carried on the plate 90 and the second cross-plate 64. The C pillar mounting plate 90 is coupled by a drawbar 92 to a rear clip 94 slidably mounted on the second or rear cross-plate 54. The rear clip 94 has a generally L-shape and is supported by a plurality of longitudinally extending linear bearings 80, one half of which is mounted on the underside of the rear clip 94 and the other portion of which is affixedly mounted on the second cross-plate 64.

Independent drive means are provided for longitudinally adjusting the position of the front clip 82 and the attached A pillar mounting plate 84, the B pillar mounting plate 88, and the rear clip 94 and the attached C pillar mounting plate 90 with respect to each other so as to vary the positions of the A pillar, B pillar and C pillar of the programmable vehicle model 10 at any desired longitudinal spacing. Specifically, the front clip drive means includes an electric motor 95 having a pair of rotatable output shaft assemblies 96 extending in opposite directions from a gear box integral with the motor 95. Due to the lateral adjustment of the width of the programmable vehicle model 10, each of the shaft assemblies 96 is formed of a telescopingly arranged shaft assembly including a tubular member 98 affixed to the output of the gear box of the front clip drive motor 95 and a smaller diameter, slidingly extendible spline shaft 100 which telescopingly extends or retracts within the tubular shaft 98 during cross-car adjustments of the width of the programmable vehicle model 10. However, due to the spline or hex cross-section of the spline shaft 100, which seats within a mating internal bore in the tubular shaft 98, the tubular shaft 98 and the spline shaft 100 rotate as a unit.

The spline shaft 100 is connected to a 90° gearbox 102, the output of which is coupled to an encoder 104 which generates output pulses to the control means dependent upon the number of rotations of the shaft 96. A lead screw 106 extends from the encoder 104 to a drive nut affixedly mounted on the front clip 82. In this manner, rotation of the lead screw 106 causes longitudinal movement of the drive nut and the attached front clip 82 along the lead screw 106 to a selected longitudinal position along the platform 12. Both lead screws 96 rotate simultaneously and in the same direction so as to adjust both of the left hand and right hand front clips 82 at the same longitudinal position along the length of the platform 12.

The B pillar drive means also includes a drive motor 110 having an output gear box 112 coupled thereto. A pair of telescopingly extendible drive shafts 114 coupled to and rotated by the gear box 112. Each of the drive shafts 114 is constructed identical to the drive shaft 96 described above and includes a tubular shaft extending from the gear box 112 and a slidingly extendible spline shaft extensibly mounted within the tubular shaft for lateral cross-wise extension during cross-car adjustment of the programmable vehicle model 10.

Each of the shafts 114 is coupled to a gear box 116. An encoder 118 is mounted on an output of the gear box 116 and generates output pulses dependent upon the number of rotations of the shaft 114 determined by the output of the gear box 116 coupled to 90°. A second drive shaft 120 extends from the encoder 118 and the gear box 116 to a drive nut affixedly mounted on the B pillar mounting plate 88. In this manner, rotation of the shaft 120 by the motor 110 causes longitudinal repositioning of the B pillar mounting plate 88 due to threading engagement of the drive nut with the threaded shaft or lead screw.

A rear clip drive is similarly constructed for moving the rear clip 94 and the C pillar 90 attached thereto by the drawbar 92 in fore/aft directions. The rear clip drive includes a drive motor 124 having a gear box 126 from which a pair of rotatable, telescopingly extendible drive shaft 128 extends. Each of the drive shaft 128 is identically constructed to the drive shaft 114 and includes a spline or hex-shaped shaft slidingly extendible from a tubular shaft coupled to the motor gear box. Each of the spline shafts 128 engage a gear box 130 to which an encoder 132 is coupled. An output drive shaft 134 extends from the encoder 132 and the gear box 130 and engages a drive nut affixedly carried on the rear clip 94 to longitudinally adjust the position of the rear clip 94 and the attached C pillar mounting plate 90 extending upon the direction of rotation of the drive shaft 128 and the lead screw 134.

It should be understood that each of the front clip drive means, the B pillar drive means, and the rear clip drive means are independently operable as well as being operable in unison for variable or equal distance movements of any of the front clip 82, B pillar plate 88, or rear clip 94 to configure the programmable vehicle model 10 in any longitudinal shape.

Figure 5:
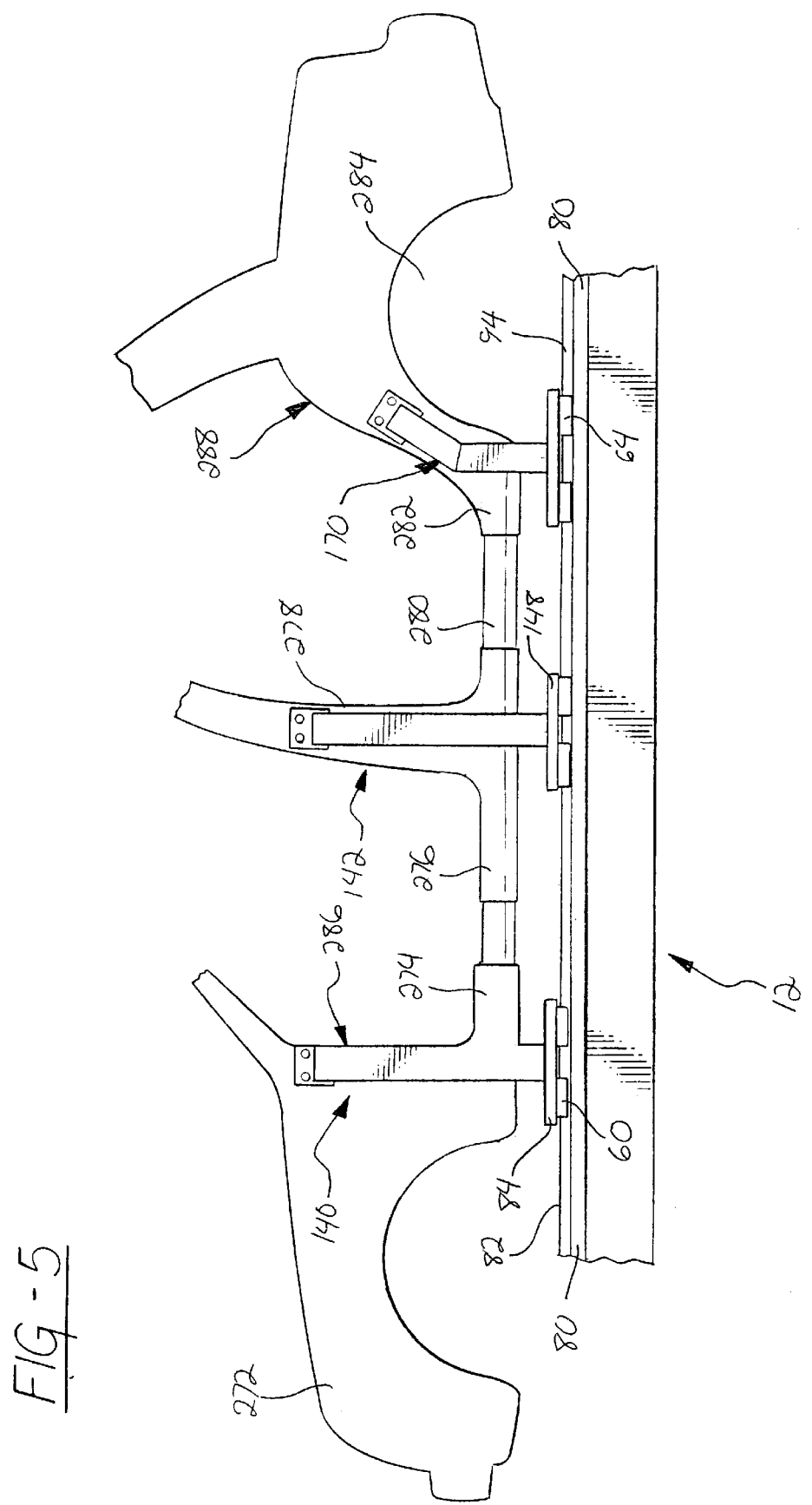
FIG. 5 is a partial, side elevational view showing internal support structure of the programmable vehicle model of the present invention.

As shown in FIG. 5, an A pillar 140 on both the left hand and right hand side of the programmable vehicle model 10, with the one right hand A pillar 140 being depicted is in the form of a generally channel-like member which is affixed at one end to the A pillar mounting plate 84 and extends upward to define a front edge of a door opening. Various body panels, such as the front fender and front door rocker panel, not shown, are affixedly mounted to the A pillar 140. A pair of hinges are also mounted on the A pillar to pivotally support a door.

A roof vertical displacement means includes a drive means mounted in each A pillar 140 and each B pillar 42. As shown in FIGS. 6 and 7, the A pillar drive means includes a motor 144 mounted within the A pillar 140. An encoder 146 and a brake 148 connected to the outward shaft of the motor and a drive shaft 150 through a first universal joint 151.

Another rotatable shaft 154 connected by universal joint 152 to the drive shaft 150 and drives a gear 156 mounted in an upper end of a clevis 158. A third universal joint 160 connects to the gear 156 and is positioned for substantially 360° rotation within a surrounding housing 162. The housing 162 is pivotally mounted to the clevis 158 for rotation with the gear 156. A mating gear 164 drives the third universal joint 160 thereby rotating a shaft 166 pivotally connected to a drive nut 168 affixed in a housing 169 to enable extension and retraction of the shaft 166 relative to the housing 169 as well as rotation about the clevis 158.

In addition to varying the height of the roof of the programmable vehicle model 10, the angular position of the shaft 166 relative to gear 156 also defines the angular position of the windshield of the programmable vehicle model 10.

A similar drive is provided for the B pillar 142, as shown in FIG. 7 except that the spherical gear 156 in the A pillar drive means is replaced by a simple universal joint 170 mounted in the clevis 158. This enables vertical angular positioning of B pillar housing 169; but without any rotation about the longitudinal axis of the rotatable shaft 154.

As shown in FIG. 1, and in greater detail in FIGS. 8 and 9, the roof 172 of the programmable vehicle model 10 is formed of four overlappingly arranged moveable panels 174, 175, 176 and 177. Each of the roof panels 174–177 is affixedly connected to a separate moveable roof frame generally in the form of two perpendicularly extending legs. Thus, roof frame 178 including legs 180 and 182 affixedly supports roof panel 174. Roof frame 184 formed of legs 186 and 188 is affixedly connected to roof panel 175. Similarly, roof frame 190 formed of legs 191 and 192 supports roof panel 176. Finally, roof frame 194 formed of legs 195 and 196 affixedly supports roof panel 177.

Roof 172 includes a fore/aft drive means, a cross-car drive means, and a whole roof fore/aft drive. The fore/aft drive means which controls the overall length of the roof 172 between the frame legs 180 and having opposed rear frame legs 192 and 195 includes a first stepper motor 198 affixedly mounted to the frame leg 188. Motor 198 has a pair of oppositely extending output shafts, one of which is coupled to a gear box 200 from which extends a first output drive shaft 202. The first drive shaft 202 extends lengthwise along the roof 172 to a fixed rotatable mount on the roof frame 194. A drive nut is mounted on the drive shaft 202 and affixed to the frame leg 196 to cause extension and retraction of the frames 184 and 194 as well as the opposite frames 178 and 190 relative to each other depending upon the direction of the rotation of the drive shaft 202.

A second drive shaft 204 extends from the motor 198 to a second gear box 206 on the opposite side of the roof 172. A third drive shaft 208 extends from the gear box 206 through a drive nut affixed to the frame leg 191. The third drive shaft 208 is parallel to the first drive shaft 202 to cause equal extension retraction of the roof frames 178 and 190 and the opposed roof frames 184 and 194.

The lateral width of the roof 172 may also be varied via the cross-car drive means including a drive motor 210 having opposed, oppositely extending output shafts, one of which is coupled to a first drive shaft 212 extending longitudinally along the roof 172 to a 90° gear box 214 affixedly mounted on the roof frame 194. The opposite output shaft of the motor 210 is coupled to a 90° gear box 216 to a second drive shaft 218 which engages a drive nut of frame leg 180. Another drive shaft 215 extends from the gear box 214 to a drive nut on frame leg 192. In this manner, the drive shafts 204 and 215 which are preferably in the form of ball screws or lead screws threadingly engaged with separate drive nuts affixedly mounted to one of the roof frame legs, enable the lateral width of the roof 172 to be varied by separating or closing the roof frames 178 and 190 as a pair from the opposed pair of roof frames 184 and 194.

For the roof length adjustment means, the first drive shaft 202 and the third drive shaft 208 preferably comprised threaded ball screws or lead screws. The second drive shaft 204 extending from the motor 198 to the gear box 206 is preferably in the form of a telescopingly arranged pair of tubular shafts with interlocking splines or polygonal flats to transmit rotation from the motor 198 to the gear box 206 and then to the drive shaft 208 while providing telescoping adjustment of the overall length of the drive shaft 208 upon the width adjustment of the roof 172. Similarly, for the width or cross-car adjustment of the dimension of the roof 172, the drive shafts 215 and 218 preferably comprise threaded ball screws or lead screws each engageable with a threaded drive nut affixed to one of the roof frames. The drive shaft 212 is preferably in the form of a telescopingly arranged pair of shafts with interlocking, but slidable spline or polygonal flat faces to allow telescoping extension and retraction of the overall length of the drive shaft 212 during adjustments in the overall length of the roof 172.

Once the overall length and width of the roof 172 is adjusted as desired, the entire position of the roof 172 may be adjusted fore/aft with respect to the B pillar 142. This is accomplished by a separate drive motor 220 mounted on the frame leg 182. A pair of oppositely extending output shafts extend from the drive motor 220, with the first output shaft engaging a 90° gear box 222 which drives a first drive shaft 224 through a universal joint 226. The other output shaft of the motor 220 is also connected through a universal joint 228 to a telescopingly arranged shaft 230 extending laterally across the width of the roof 172 to the opposite frame leg where it is coupled through a universal joint 232 to another 90° gear box 234. As with the opposite side of the roof 172, the gear box 234 drives a drive shaft 236 through a universal joint 238.

A support structure is provided for supporting each of the drive shafts 224 and 236. As each of the support structures are identical, the following description for the support structure supporting the drive shaft 236 will be understood to apply equally to the support structure supporting the drive shaft 224.

Figure 9B:
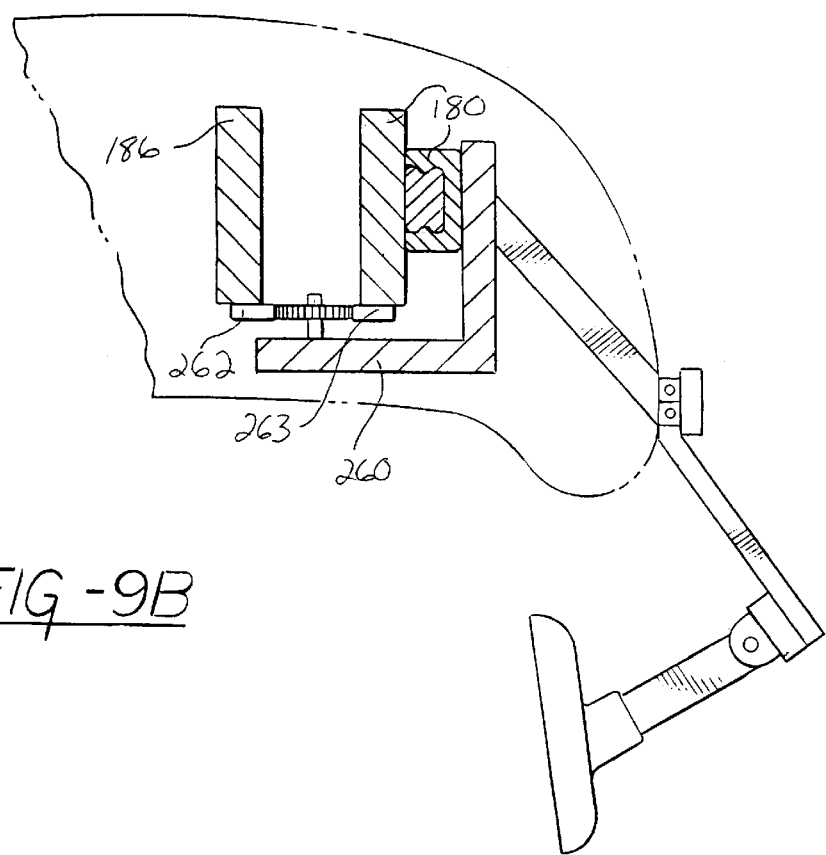
FIG. 9B is a side elevational view of a mirror centering mechanism shown in FIGS. 8 and 9A.

As shown in FIGS. 8, 9A and 9B, a pair of spaced arms 244 are typically connected at one end to the leg 188 of the frame 184. The arms 244 project outwardly and slightly downwardly from the frame leg 188 and support a shaft 246 at an outer end. The one outer end of the shaft 246 is affixedly mounted in a block 248 which also receives the fixed connection between the U-joint 238 and the drive shaft 236.

A bracket 250 is slidably mounted on the shaft 246 and carries a depending leg 252 which is affixedly connected to one end of the housing 169 of the B pillar drive shaft 166 shown in FIG. 7. In this manner, elevational changes in the B pillar drive are transmitted through the bracket 250 and its corresponding bracket on the opposite side of the roof 172 to the entire work structure to selectively raise or lower the roof structure 172. At the same time, rotation of the drive shaft 236 through a drive nut 237 by activation of the motor 220 causes longitudinal repositioning of the arms 244 and the attached frame 194. This causes the entire roof 172 to translate fore/aft as a unit.

As shown in FIG. 8, a panel support center frame 254 is connected between legs :191 and 192 of the roof frame 190 to support a center portion of the overlapped roof panels 174–177.

As shown in FIGS. 9A and 9B, a unique mirror support bracket 260 is slidably mounted on frame leg 180 by bearing 261 at the front of the roof 172. Toothed racks 262 and 263 are mounted on frame legs 180 and 186, respectively, and are engaged by a centrally positioned gear 264 rotatably carried on the mirror bracket 260. Since the frame legs 180 and 186 move in opposite directions during cross-car adjustments of the roof 172, the gear 264 remains stationary between the frame legs 180 and 186 through interactive of the gear 264 with the racks 262 and 263 to center the mirror 260 in the interior of the programmable vehicle model 10.

Figure 9C:
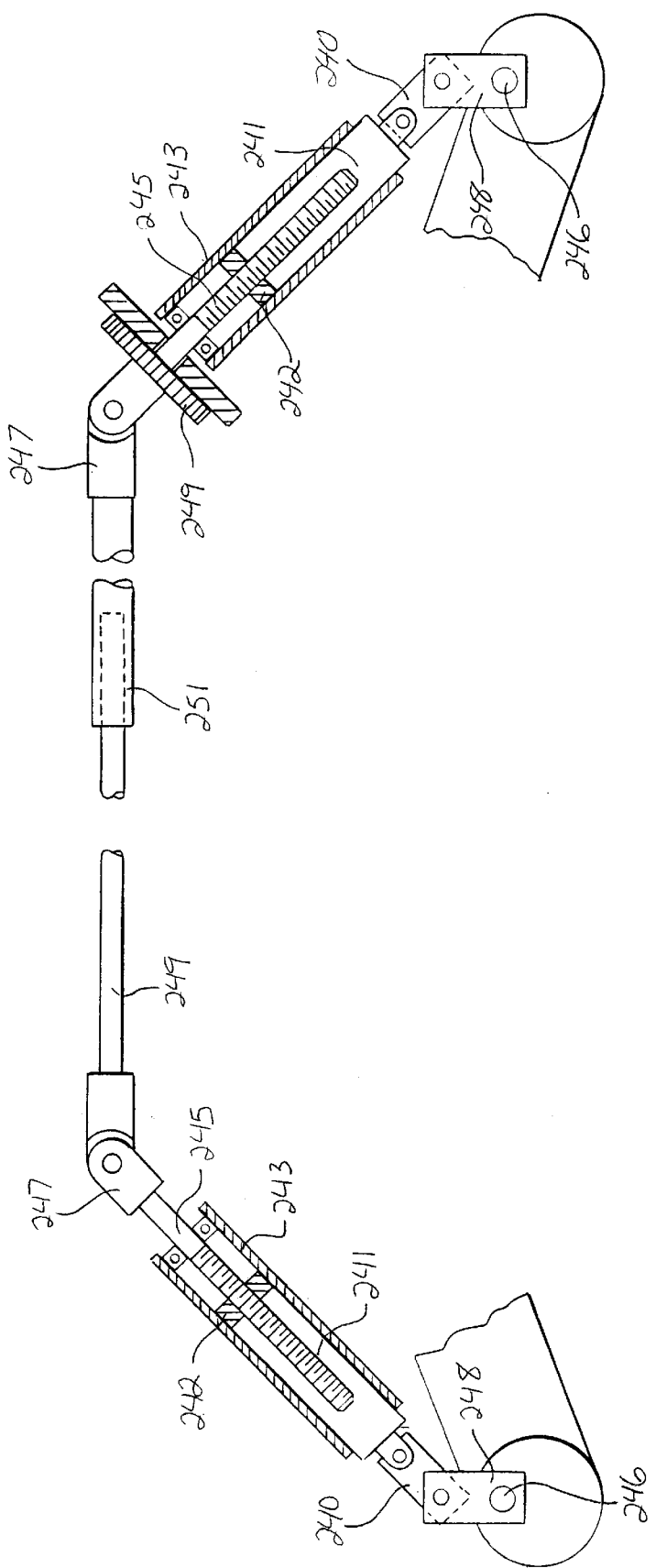
FIG. 9C is an end view of a roof anti-sway mechanism.

FIG. 9C depicts an anti-sway mechanism for preventing the roof from collapsing sideways. A link 240 is pivotally mounted in the blocks 248 on each side of the roof frame. The links 240 are pivotally connected to a sliding member 241 which carries a drive nut 242 at one end. Both the slider 241 and the drive nut 242 are slidably disposed within a block 243 and positioned to receive a threaded lead screw 245. On one side of the roof frame, the lead screw 245 is connected through a universal joint 247 to a first tubular shaft 249 which is telescopingly disposed within a second shaft 251. The second shaft 251 is connected to a universal joint 247 on the opposite side of the roof frame. The universal joint 247 driven by the second shaft 251 drives one gear of a two gear pair 249 mounted on rigid structure on one side of the roof frame. The other gear of the gear pair 249 rotates the threaded shaft 245 in the opposite block 243.

In operation, rotation of the shafts 246 through elevation or lowering movements of the B pillar drives will cause rotation of the devises 248 and thereby pivotal movement of the links 240 in complementary directions, such as pivotally inward in the orientation shown in FIG. 9 or pivotally outward. Rotation of the links 240 drives the slider members 241 within the blocks 243 thereby causing extension or retraction of the first tubular shaft 249 within the second tubular shaft 251. The gear pair 249 reverses the direction of rotation of the universal joint 247 connected thereto to provide complementary directional movement of the lead screws 245. In this manner, the roof frame merely exhibits elevational changes, i.e., vertically up or vertically down, with respect to the remainder of the programmable vehicle model 10, without any sideways rotational movement.

A plurality of outer body panels are affixedly mounted on the A pillar 140, the B pillar 142 and a C pillar 170 as shown in FIG. 5. Certain portions of the outer panels are telescopingly overlapped to present a solid exterior surface despite any positional arrangement of the panels during movement of the programmable vehicle model 10 in lengthwise and/or lateral directions.

As shown in FIG. 5, a front fender 272 extends from the front end of the programmable vehicle model 10 to the A pillar 140 and along a front portion of the bottom rocker panel of the programmable vehicle model 10. The bottom rocker panel 274 overlays a similar rear rocker panel 276 attached to a B pillar panel 278. A rear extending rocker portion 280 extends from the B pillar panel 278 and overlays a corresponding rocker panel 282 extending from a C pillar panel 284. C pillar panel 284 is affixedly attached to the C pillar 170 generally in the form of a frame constructed of tubular members affixedly mounted on the C pillar mounting plate 90 affixedly connected to the rear clip 94. A rear fender, shown in FIG. 1, is also attached to the C pillar support 284 but extends rearwardly to the rear bumper or facia of the programmable vehicle model 10.

The various panels define door openings including a front door opening 286 and a rear door opening 288 on both sides of the vehicle 10. Each door opening 286 and 288 receives an individual front door 290 and rear door 292, each pivotally attached to the A pillar 140 and B pillar 142, respectively.

As shown in FIG. 10, a door frame 300 is constructed for each of the front and rear doors 290 and 292 of the vehicle 10. The door frame 300 is formed of hollow, tubular members which are affixedly connected at outer ends two end panels 302 which carry the hinge pins and a portion of a lock mechanism used to pivotally mount the door 290 or 292 on the A pillar 240 or B pillar 242 as well as to lock and unlock the door relative to the B pillar 142 or C pillar 270.

Each door, such as the rear door 292 is formed of two outer, telescopingly arranged door panels 304 and 306, one of which is affixedly connected to the front most end panel 302 and the other door panel 306 is connected to the rear end panel 302. The door frame 300 is slidably mounted by bearing to a pair of channels 308 each extending from one of the door end panels 302. In this manner, the door panels 304 and 306 may be telescopingly extended or retracted relative to each other to adjust the length of the door 290 or 292 to the overall size of the front or rear door opening 286 and 288, respectively.

An arm rest frame 310 is affixedly attached to the door frame 300 and supports a threaded lead screw 312. The lead screw 312 engages a drive nut 314 affixedly mounted on a bracket 313 to control the vertical position of an arm rest carried on the bracket. Vertical movement of the arm rest is controlled by a drive motor 316 which moves along the lead screw 312 to raise or lower the arm rest on the door 290 or 292. The arm rest projects through an opening in an inner door panel, not shown, and includes an elongated, generally planar base which completely closes the opening in the inner door panel regardless of the vertical position of the arm rest relative in the opening.

As shown in FIG. 1, the front deck lid or hood as well as the rear deck lid or trunk lid are each substantially identically formed of three panels including two outer panels 294 and 296 and a center fixed panel 298 which overlays the inboard ends of the outer panel 294 and 296. The center panel 298 is affixedly mounted on underlying support structure on the platform 12 to remain centrally positioned along the longitudinal axis of the platform 12. However, the support structure for the outer panels 294 and 296 are affixedly mounted on the front and rear fore/aft clips 82 so as to be moveable both in a longitudinal fore/aft direction as well as laterally or cross-car as described hereafter. During such lateral movements, the outer panels 294 and 296 reciprocally move relative to the fixed center panel 298 such that all three panels 294, 296 and 298 continually present a solid exterior deck lid surface regardless of the overall width or length of the deck lid.

As both the front deck lid and rear deck lid support frames are substantially identically constructed, the following description of the means for varying the elevation of the rear deck lid 320 as well as changing the angular position of the rear deck lid 320 relative to the platform 12 along longitudinal axis of the platform 12 will be understood to apply equally to the means for changing the elevation and angle of the front deck lid 322 of the programmable vehicle model 10.

As shown in FIG. 11, four longitudinally and laterally spaced columns 324 are affixedly mounted by means of brackets 326 to the second or rear cross-car plates 64. Each tubular column 324 is hollow and supports an internally mounted lead screw and drive nut which are driven by a gear box 325 mounted in two of the brackets 326 and a drive motor 327. Rotation of the lead screw causes the drive nut, which is affixed to an upward disposed shaft, to raise or lower the shaft relative to the tubular columns 324. Each shaft 328 is slidably disposed within one of the tubular columns 324 and has an outward projecting end, which is pivotally connected to a clevis 330. The gear box 325 in two brackets 326 is also connected to telescoping cross shaft 332 formed of a larger diameter outer shaft and a smaller diameter splined or polygonal shaped extendable shaft which is connected at one end to a gear box in the laterally opposed column 324. In this manner, activation of the drive motor 327 on one of the tubular columns 324 causing equal and like raising and lowering of the shaft 328 in the laterally opposed column 324.

The tubular column 324 are arranged in two longitudinally spaced pairs, each with a separate drive motor 327. A pair of split, generally U-shaped tubular frames 334 and 336 are fixed to the devises 330 on the shafts 328 of each pair of longitudinally spaced columns 324. Each U-shaped tubular frame 334 and 336 is formed of three end connected tubular members with two of the members extending laterally inboard in parallel from a longitudinally extending outer member. The inner ends of the inward extending members of each tubular frame 334 and 336 are spaced apart; but are aligned with each other.

A upper centering mechanism is connected to the opposed ends of each inward extending member of the U-shaped tubular frames 334 and 336. As shown in FIG. 11, the upper centering mechanism precludes a block 342 which supports a pad 344 connectable to the fixed center deck lid panel. The tubular shaft extends between the aligned ends of the legs of the U-shaped frames 336 and 338 through the block 342. The centering mechanism includes a pair of opposed racks 346 and 348, each of which is connected to one of the inward extending members as the frames 334 and 336. A rotatable gear not shown, projects from the bottom of the block 342 and engages the opposed racks 346 and 348. In this manner, during cross car or lateral adjustments of the width of the programmable vehicle model 10, the U-shaped frames 334 and 336 will move oppositely to each other thereby moving the respective racks 346 and 348 in opposite directions. However, the gear on the block 342 insures that the block 342 and the center lid panel remains centered on the longitudinal axis of the programmable vehicle model.

A similar lower centering mechanism is provided between a pair of inward projecting legs 362 connected to and extending inboard from the rear most tubular columns 324. A block 352 is mounted on a bracket 353 attached to one of the legs 362 and supports a gear 354 on an upper surface. A pair of racks 356 and 358 are each attached to one of the legs 362 and movable with the respective legs 362 during lateral or cross car adjustments of the platform 12. As the racks 356 and 358 move in opposed directions, the racks 356 and 358 maintain the gear 354 and the block 352 centered along the longitudinal axis of the platform 12.

The rear facia or bumper of the vehicle is also formed with a fixed center portion and two laterally movable outer portions, each attached to and depending from corresponding portions of the rear deck lid 320. A lower portion of the fixed center portion of the rear facia is connected by means of a bracket to the lower block 352. The movable outer portions of the rear facia move laterally with corresponding outer ends of the deck lid 320.

Referring now to FIGS. 12 and 13, there is depicted a perspective views of one of the adjustable seat mechanisms usable as any of the front/rear seats of the programmable vehicle model 10. The seat mechanism is provided with fore/aft adjustment independently from each other seat as well as the platform 12 and fore/aft plates mounted on the platform 12, independent cross car or laterally adjustment, independent vertical up and down adjustment, and a unique tilting or angular arrangement of the seats supports to change the angular disposition of the entire seat mounted on the seat mechanism. It will be understood that any conventional seat may be employed on the seat frame described hereafter.

Each seat includes a seat frame noted generally by reference number 370 which includes a plate 372. The plate 372 positioned within one of the cutouts or apertures in the platform 12 as shown in FIG. 4. Two part linear bearings 376 are mounted on the underside of the right and left hand cross car plates 60 and on pads 374 fixed generally at the corners of the plate 372. The bearings 376 provide longitudinal fore and aft adjustment of the plate 372 and the seat mounted thereon.

A block 378 is mounted on the plate 372 and supports a drive nut 380 which threadably engages a threaded lead screw 382. The lead screw 382 is rotated by a drive motor 384 through a gear box 386 shown in FIG. 4. The drive motor 384 and gear box 386 are mounted on the first cross car plate 60. In this manner, activation of the drive motor 384 causes rotation of the lead screw 382 in one of two opposed directions to longitudinally adjust the position of the plate 372 and the seat supported thereon with respect to the platform 12 and the surrounding the programmable vehicle model 10.

The block 378 also supports another drive nut 388 which threadably engages a lead screw 390. The lead screw 390 is coupled by a gear box 392 to a drive motor 394. The lead screw 390 projects through the gear box 392 so as to cause laterally movement of the gear box 392 and the drive motor 394 upon energization of the drive motor 394.

The drive motor 394 and gear box are fixedly mounted on one end of an upper plate 396 which is laterally movable across the plate 372 by means of linear bearings not shown, interposed between the upper plate 396 and the plate 372. In this manner, activation of the motor 394 and movement of the motor 394 and gear box 392 along the lead screw 390 causes independent lateral adjustment of the upper plate 396.

A vertical drive unit 400 is carried on the upper plate 396 and projects through an aperture in the lower plate 372. A vertical drive motor 404 is fixedly mounted to the underside of the upper plate 396. A rotatable small diameter gear 406 is mounted to the output shaft of the motor 404 and threadably engages a large diameter gear 408 disposed over the upper surface of the upper plate 396. An elongated, rotatable spline shaft 410 extensively extends through an aperture in the large diameter gear 408, with a lower end portion of the spline shaft 410 projecting below the plate 372. A spline nut 412 has an outer housing affixed to the upper plate 396 and includes an internally rotatable ball nut which engages threads on the spline shaft 410. The drive nut 412 is fixedly mounted to and rotatable with the gear 408 so as to cause vertical extension or retraction of the upper end of the spline shaft 410 relative to the upper plate 396 upon activation of the vertical drive motor 404. It should be noted that the shaft 410 includes elongated splines to maintain the shaft 410 in a set angular position relative to the upper plate 396 while still enabling vertical displacement of the shaft 410. A mounting bracket 414 is mounted on the upper shaft 410.

FIG. 13 depicts the seat support 416 which slidably supports seat mounting pads 418 for attaching a conventional seat to the seat support 416.

The seat support 416 includes a mount 422 generally in the form of a block having a central bore for receiving the mounting bracket 414 on the end of the shaft 410. A plate 424 extends from one side of the mount 422 and carries a coupler 426. A drive motor 428, coupler 430 and gear box 432 are interconnected and coupled to the coupler 426 as shown in FIG. 13. A universal joint 434 is interconnected between the coupler 426 and a drive shaft 436. The drive shaft 436 is threadably engageable in a threaded bore in a shaft 438 carried to a pivot bracket 440. In this manner, rotation of the universal joint 434 and drive shaft 436 causes extension retraction of the drive shaft 436 relative to the shaft 438 and results in movement of the pivot bracket 440.

The pivot bracket 440 is pivotally connected to one of the seat mounting pads 418 slidably mounted on an arcuate shaped track 442. An opposed seat mounting pad 418, not shown, on the opposite end of the seat 420 is slidably mounted on an opposite end of the track 442. A similar track 444 is disposed on the opposite side of the mount 422 for supporting seat mounting pads 418 on the opposite side of the seat 420. Each of the arcuate tracks 442 and 444 are slidably mounted in the brackets 446 affixed to the mount 422.

In operation, rotation of the drive shaft 436 in one of two opposed directions will cause movement of the shaft 438 toward or away from the coupler 426 which is fixedly mounted on the plate 424 attached to the mount 422. This exerts a force on one end of the arcuate track 442 causing the track 442 to slide in its mounting bracket 446 to a particular selected arcuate position. The opposed track 444 also slides in its mounting bracket 446 due to its rigid connection to the track 442 via the seat mounting pads 418 and the seat 420. In this manner, the angular orientation of the seat 420 may be independently adjusted.

Figure 14:
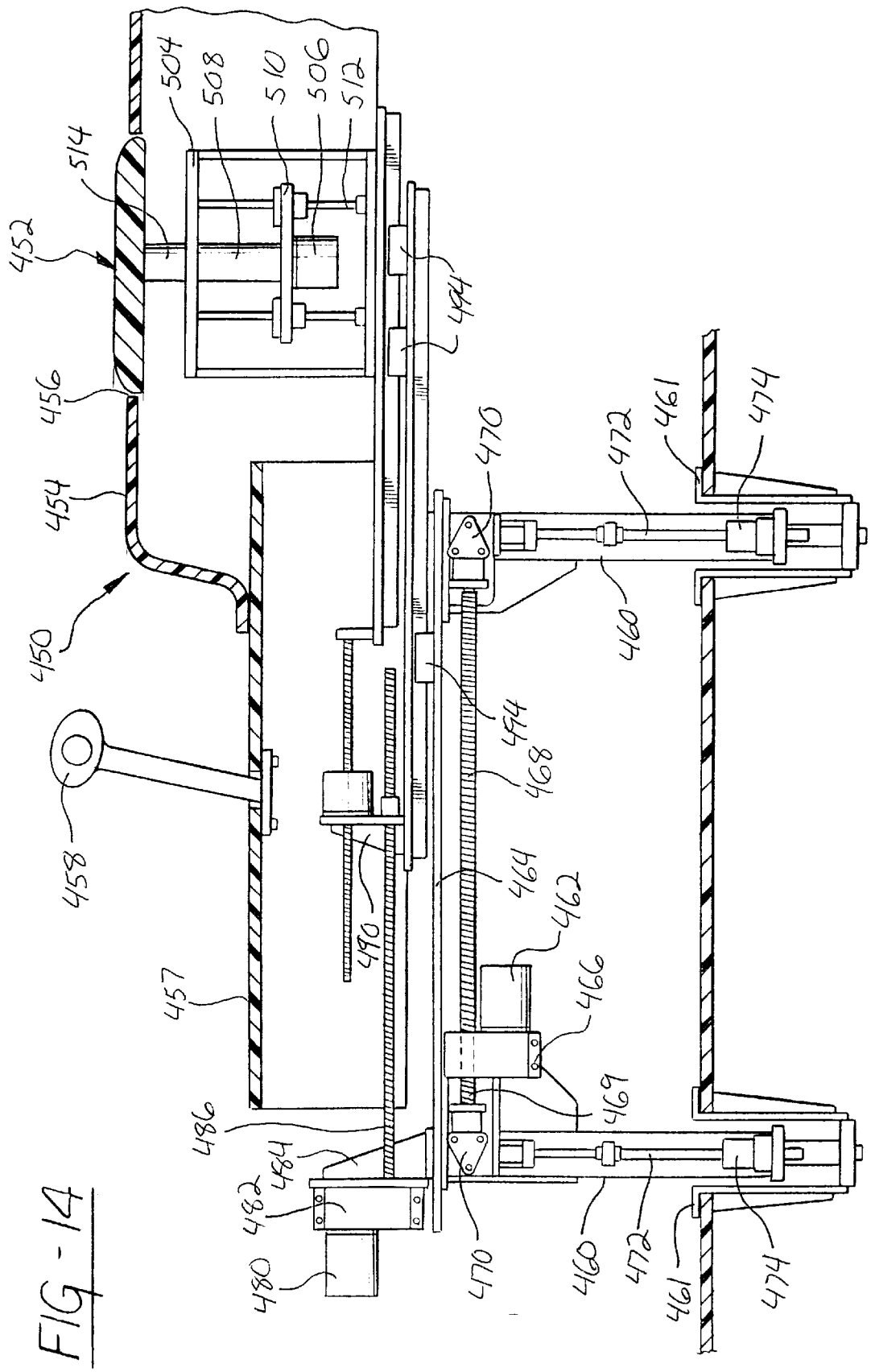
FIG. 14 is a side elevational view of the console, arm rest and gear shift adjustment mechanism of the programmable vehicle model.
Figure 15:
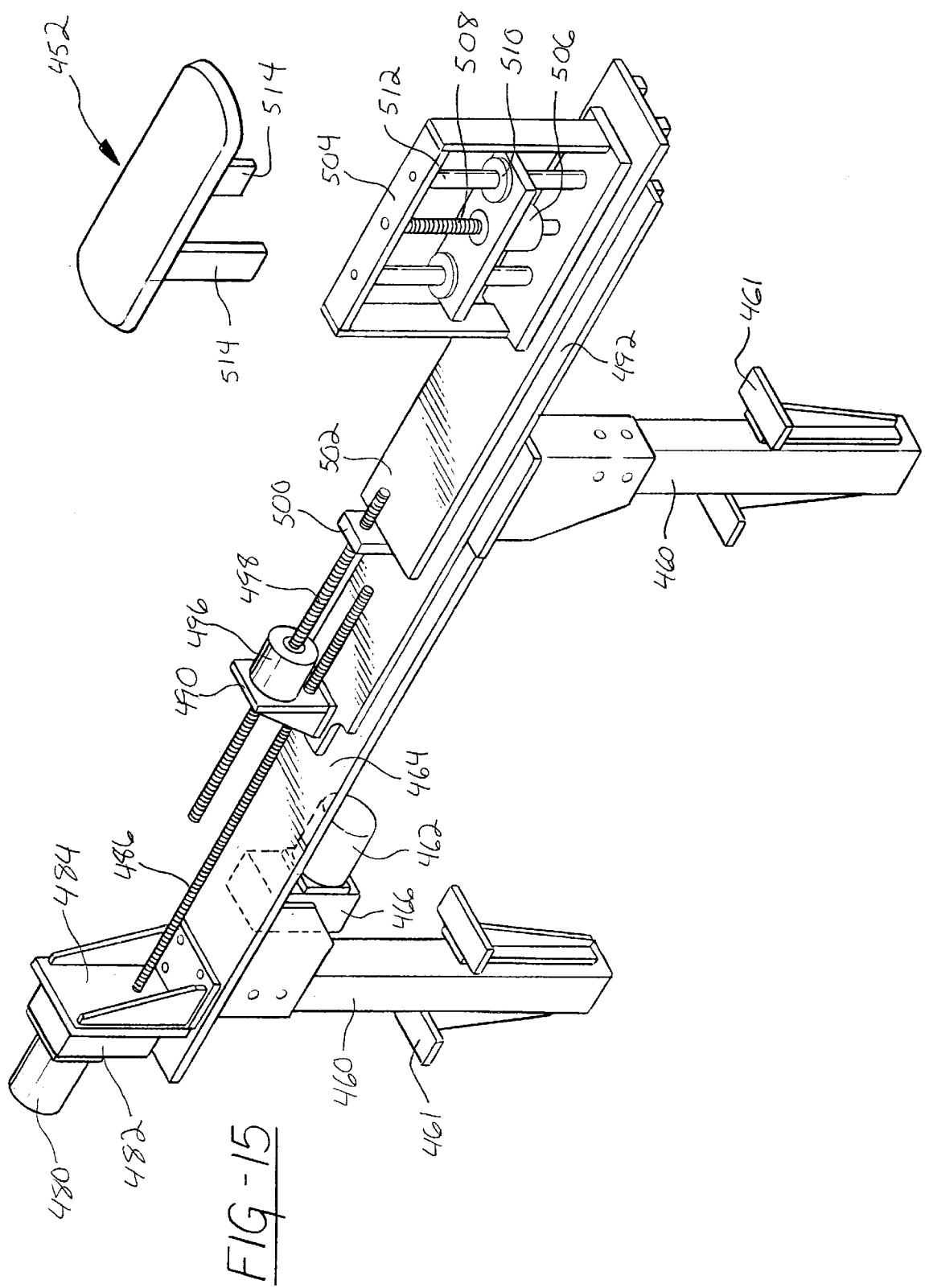
FIG. 15 is a perspective view of the console, arm rest and gear shift adjustment mechanism shown in FIG. 14.

The programmable vehicle model 10 of the present invention also includes a unique interior center console 450 with separately elevatable arm rest 452 shown in FIGS. 14 and 15. The console 450 is formed of a shell 454 having an aperture 456 at a top end for receiving the elevatable arm rest 452 therethrough. A front end of the shell 454 slidably receives a tunnel-like shell 457 which has a gear or transmission shifter 458 fixedly mounted thereon. The shell 454 and tunnel-like shell member 457 are mounted on underlying support structure and are adapted for sliding, telescoping movement relative to each other along the longitudinal axis of the platform 12.

The console 450 includes a support frame having a pair of spaced, hollow tubular supports 460 which have collars 461 mountable on the center tubular member 14 of the platform 12. A portion of the tubular supports 460 projects through apertures in the center tubular member 14 as shown in FIG. 14. A drive motor 462 is mounted by means of a bracket to an elongated first frame member 464 which is joined to upper ends of the tubular supports 460 and extends across the supports 460. A gear box 466 couples the output shaft of the motor 462 to drive shafts 468 and 469 which extend from opposite sides of the gear box 466 to separate gear boxes 470 disposed at the upper ends of both tubular supports 460. The gear boxes 470 are joined to secondary drive shafts 472 disposed in each tubular support 460 which threadingly engage a drive nut 474 fixedly mounted in each tubular support 460. In this manner, rotation of the outward shafts 468 and 469 of the motor 462 in one of two directions through the gear boxes 466, the drive shaft 468, the gear boxes 470 and the secondary drive shafts 472 causes vertical elevating or lowering of the secondary drive shafts 472 relative to the fixed tubular supports 460. This elevating or lowering of the secondary drive shafts 472 effects upward or downward movement of the frame member 464 which is mounted on the upper ends of the secondary drive shafts 472 for a global vertical positioning of the entire console 450, arm rest 452, and shifter 458.

Longitudinal fore and/aft positioning of the gear shifter 458 relative to the arm rest 452 is provided by a drive motor 480 which is coupled to a gear box 482 mounted on a bracket 484 fixed to one end of the frame member 464. A threaded lead screw 486 extends from the gear box 482 to a drive nut 488 affixed on a second mounting bracket 490.

The mounting bracket 490 is fixedly supported on a second elongated frame member 492. The second frame member 492 overlays the first frame member 464 and is slidably supported thereon by means of linear bearings 494 mounted on opposing faces of the frame members 464 and 492.

In operation, the rotation of the lead screw 484 by the motor 480 causes movement of the mounting bracket 490 and the second frame member 492 relative to the frame member 464. This movement sets the longitudinal position of the gear shifter 458 which is mounted via the tunnel-like shell 457 on the second frame member 492.

A drive motor 496 is mounted on the mounting bracket 490 and bi-directionally rotates a lead screw 498 extending therethrough. One end of the lead screw 498 engages a threaded bore in a plate 500 mounted on one end of a third frame member 502. Linear bearings 494 mounted on facing surfaces of the third frame member 502 and the second frame member 492 enables sliding movement of the third frame member 502 relative to the second frame member 492. However, both of the second and third frame members 492 and 502 can be repositioned as a unit upon rotation of the first lead screw 484 by the motor 480.

Rotation of the lead screw 498 by the motor 496 moves the plate 500 and the third frame member 502 toward or away from the motor 496 depending on the direction of rotation of the lead screw 498. This dimensionally positions the console 450 and the arm rest 452 relative to the gear shifter 458.

The arm rest 452 has a plate 504 mounted within the shell 454 on the third frame member 504. The plate 504 extends across the opening 456. A vertical drive motor 506 rotates a lead screw 508 which is rotatably supported on the plate 504 and another plate on the third frame member 502. The motor 506 is fixed to a movable plate 510. The plate 510 is supported on a pair of linear bearing 512 for vertical movement within the arm rest housing 452 by engagement of a rotatable drive nut in the motor 512 with the threaded lead screw 508. The pad has tabs 514 which are joined to the plate 510. In this manner, the plate 510 and the arm rest pad supported thereon may be vertically extended or lowered relative to the surrounding shell 454

In this manner, the console 450 may be adjusted as a unit both fore and aft or up and down in the programmable vehicle model 10. In addition, the simulated gear shifter 458 may be adjustably positioned fore and aft independent of the arm rest 452. This enables the spacing between the gear shifter 458 and the arm rest 452 to be adjustably varied. The arm rest 452 may also be elevated independently from the global up and down adjustment feature of the complete console 450.

Figure 17:
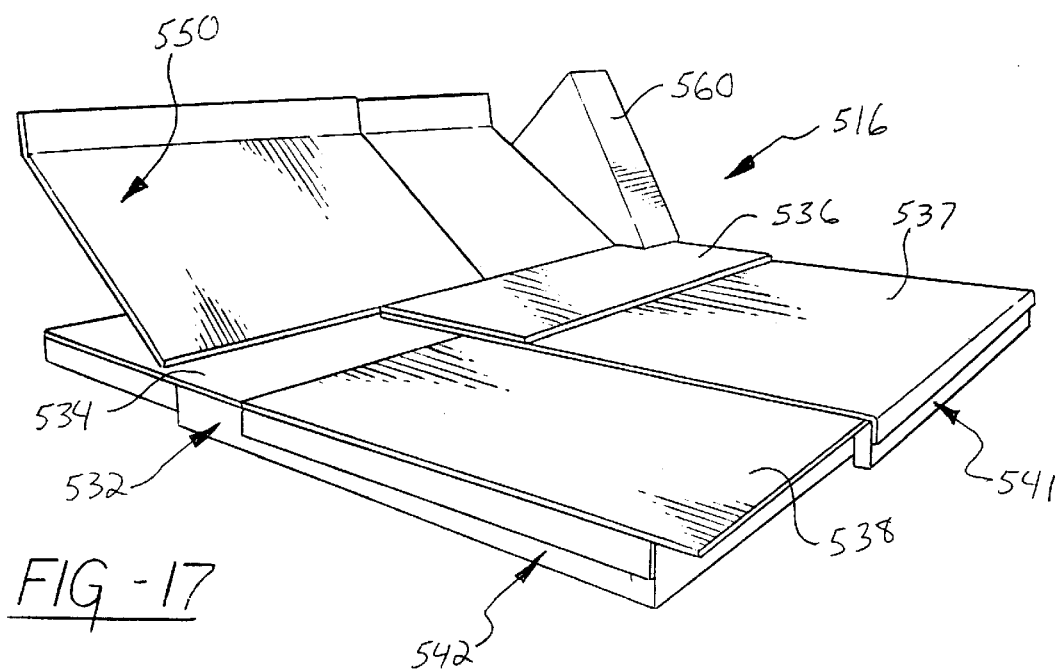
FIG. 17 is a perspective view of the upper floor panels, toe plate and wheel well in a partially lengthwise and laterally expanded position.

The programmable vehicle model 10 also includes adjustable floor assemblies 516 for each of the four seats 420 in the front and rear of the programmable vehicle model 10. The front floor assemblies 516, as shown in FIGS. 4, 16 and 17, are mounted on the first cross car plates 60 and are movable laterally with the first cross car plates 60. Each front floor assembly 516 employs a spline shaft, gear pair and vertical drive constructed substantially identically to the vertical drive unit of the seat 420. The vertical drive motor has a small diameter gear mounted on the end of its output shaft which engages a large diameter gear 522 positioned over the top surface of the first cross car plate 60. A spline ball nut is fixedly mounted to the large gear 522 and engages a rotatable shaft which projects through the ball nut in the large gear 522. Rotation of the ball nut by the drive motor causes vertical extension and retraction of the shaft and a mounting bracket 528 on the top end of the shaft.

The mounting bracket 528 engages a mating mounting block 530 in a floor frame assembly 532, shown in FIG. 16. The frame assembly 532 is formed of a plurality of interconnected tubular frame members which support a centrally located floor plate 534. A plurality of plates 536, 537 and 538 are disclosed in an overlapped arrangement over the floor plate 534 and the frame 532.

The individual floor plates 534, 536, 537 and 538 are mounted on L-shaped frames 540–542 similar to those employed in the roof 172. Plate frames 540–542 are arranged in a side-by-side overlapping arrangement with respect to portions of the adjacent plate frames and interconnected by linear bearings, not shown, for lateral and fore/aft repositioning of each of the plates 536, 537 and 538 relative to each other and to the plate 534.

As shown in FIG. 16, a motor 544 has its output shaft 546 threadingly engaged in an internal threaded bore in a shaft 548 fixedly mounted on the floor frame of the laterally adjacent floor assembly, not shown. A gear pair 547 is rotatably mounted on the floor frame 532. One of the gears of the gear pair 547 is rotated with rotation of the output shaft 546 of the motor 544. This gear drives the opposite gear which is fixedly mounted on a ball screw 548. The ball screw extends between fixed, rotatable mounting in the two adjacent floor frames 532 to control the lateral movement of the two adjacent floor frames 532 relative to each other. Rotation of the output shaft 546 by the motor 544 in one of two opposed directions causing the width or spacing between the adjacent floor frames 532 to be varied as desired.

It should also be noted that the motor 544 and shafts 546 and 548 can be deleted such that movement of the first cross car plates 60 determine the width or spacing between the adjacent floor frames 532.

In operation, the floor plates 534 and 536 may be adjusted laterally at varying dimensions relative to each other. In addition, the floor plates 534 and 536 may be moved fore and aft as a unit to vary the overall length of the floor assembly with respect to the adjacent pair of plates 537 and 538. The adjacent plates 537 and 538 may also be adjusted laterally with respect to each other or fore and aft as a unit.

The front portion of the front floor frame 532 is fixed in position relative to the platform 12. However, the rearmost frames 541 and 542 are connected by means of a pair of cables to the front seat frame 370 so as to be movable in fore/aft directions with movement of the front seat frame 370. Cables cause expansion or retraction of the frames 541 and 542 relative to the frames 532 and 536 with rearward and forward of the seat frame 370.

This structure provides the floor frame 532 with individual up and down, and fore and aft movements as well as lateral cross-car movement upon lateral adjustment of the position of the first cross-car plate 60. During such movements, the floor plates 534, 536, 537 and 538 disposed over the frames 540–542 automatically expand to provide a constant closed surface over the floor frames despite any position of the floor frames relative to the adjacent seat.

Figure 18:
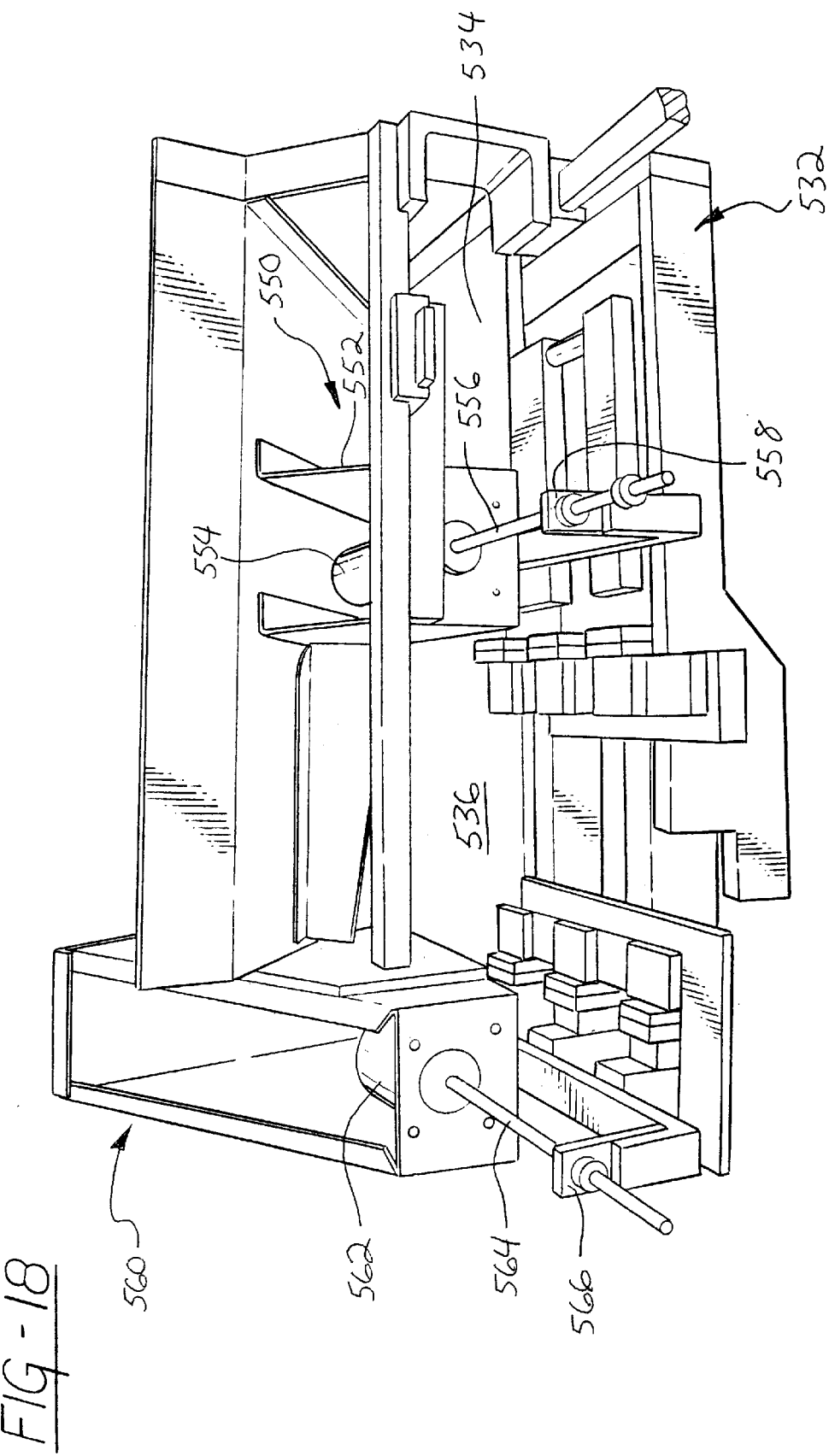
FIG. 18 is a rear perspective view of the toe panel and wheel well shown in FIG. 17.

An angular toe plate 550 is mounted over a forward end of the floor plates 534 and 536 as shown in FIGS. 17 and 18. A pair of brackets 552 project rearwardly from the back surface of the toe plate 550 and support a fore/aft drive motor 554. The lead screw 556 extends through the drive motor 554 and engages a drive nut 558 mounted on the floor frame 532. The bracket 552 is mounted on sliders or linear bearings affixed to the floor frame 532 as such that energization of the motor 554 causes rotation of lead screw 556 and thereby fore/aft movement of the motor 554, bracket 552 and toe plate 550 to variably adjust the fore/aft position of the toe plate 550 relative to the front floor assembly 516. It should be noted that the angle of the toe plate 550 remains fixed at all fore/aft positions.

A unique wheel well 560, shown in FIGS. 17 and 18, is also mounted on the front floor frame 532 to simulate the hump produced on a conventional vehicle floor pan by the vehicle wheel well. In the programmable vehicle model 10, the wheel well 560 is selectably moveable in a fore/aft direction by means of a drive motor 562 mounted at a rear end of the wheel well 560. The drive motor 562 rotates a lead screw 564 which engages a drive nut 566 mounted on fixed structure on the front floor frame 532. In this manner, rotation of the lead screw 564 by the motor 562 causes fore/aft movement of the motor 562 and the wheel well 560 to any desired position relative to the front floor assembly 516 and/or the toe plate 550.

The rear floor assemblies are substantial identical to the front floor assemblies and include an identical vertical drive for adjusting of the vertical height of the rear floor assembly relative to the platform 12. However, the fore/aft and lateral positioning of the rear floor frames are controlled by movement of the front seats by a fixed connection of the rear floor frames to the front seat frame assemblies. In this manner, laterally repositioning of the spacing between the front seats causes a similar laterally repositioning of the rear floor assemblies. Fore/aft movement of each individual front seat also result in fore/aft extension or retraction of the individual floor plates of the corresponding rear floor assembly. This enables the rear floor assembly to perform its function of covering any opening in front of the rear seats and providing a foot support between the front and rear seats.

Figure 19:
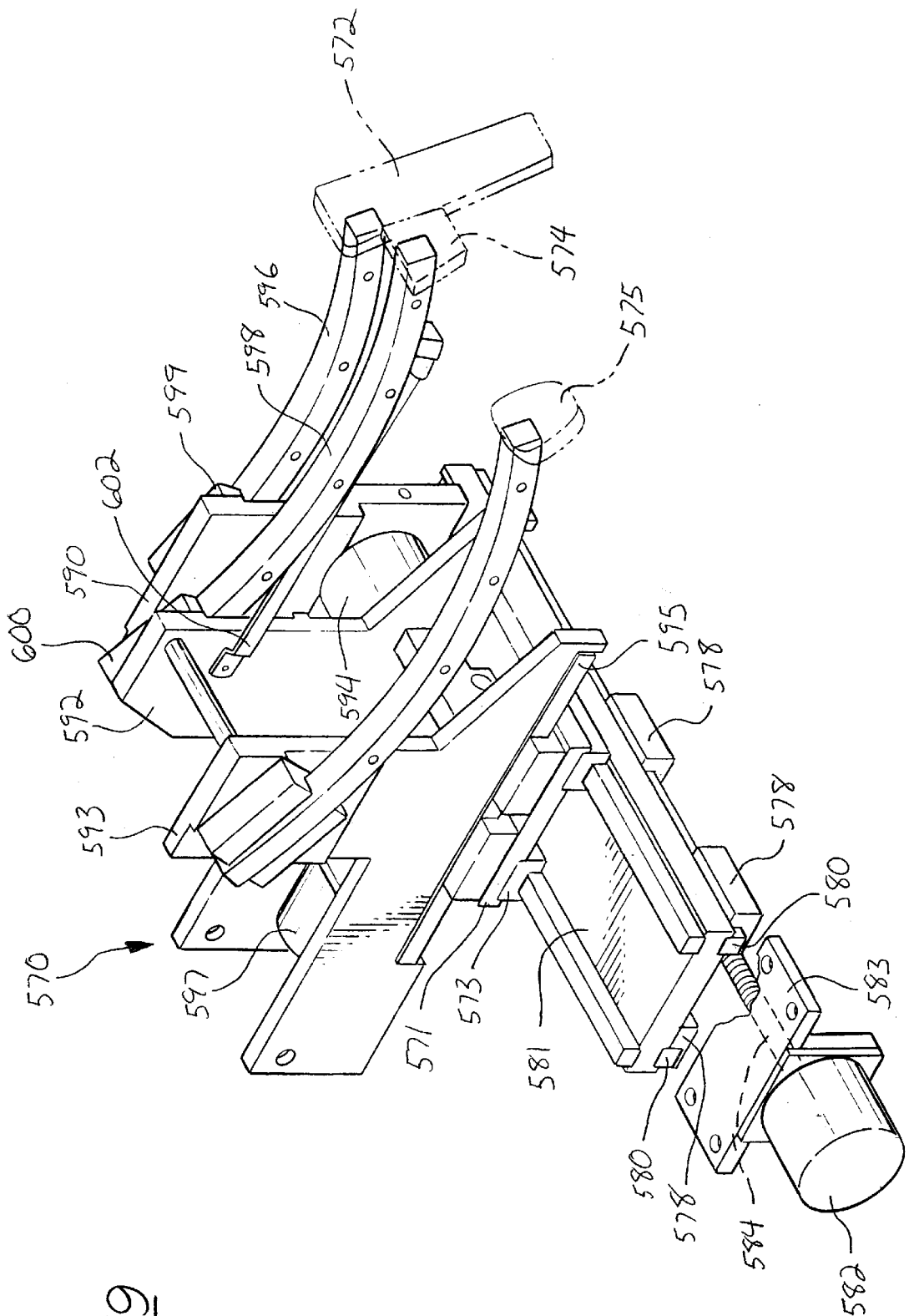
FIG. 19 is a perspective view of the pedal positioning mechanism of the present programmable vehicle model.

A pedal assembly 570 is shown in FIG. 19 and includes an accelerator pedal 572, a brake pedal 574, and an optional clutch pedal 575. The pedal assembly is mounted forward of the toe plate 530 on the frame 532 of the driver's front floor assembly 516. Although the pedal assembly 570 is illustrated as being mounted on the front floor assembly 516, it will be understood that the pedal assembly 570 can be simply mounted on the front cross car plate 60 for lateral movement with the front cross car plate 60.

As shown in FIG. 19, the pedal assembly 570 includes a plurality of linear bearings, one half of which are fixedly mounted to the underlying the floor frame assembly 516. The other half of the linear bearings are mounted on a pair of slide rails 580 which support a plate 581. The drive motor 582 is fixed by a bracket 583 to the floor frame 516, and rotates a threaded lead screw 584 which extends through a drive nut mounted on a bracket, not shown, affixed to the plate. In this manner, activation of the motor 582 rotates the lead screw 584 which drives the bracket 586 and the attached plate 581 laterally to a selected position relative to the slide rails 580. The plate 581 supports an upstanding accelerator pedal support bracket 590, brake pedal support bracket 592 and a clutch support bracket 593. In this manner, the brackets 590, 592 and 593, and the associated accelerator pedal 572, brake pedal 574 and clutch pedal 575 may be laterally repositioned as a unit relative to the front floor assembly 516 independent of any lateral adjustment provided by the front or first cross car plate 60 as described above.

A separate lateral repositioning movement is also provided for the brake pedal 574 and clutch pedal 575 to enable the distance or space between the accelerator pedal 572 and the brake pedal 574 to be varied. A plate 571 is mounted by bearings 573 and slide rails 576 on the plate 58 for lateral movement over the plate 581. A drive motor 594 is mounted on the brake support bracket 592 and drives a lead screw, not shown, engaged in a drive nut mounted in the motor 594 and rotatably supported on the support bracket 590. Activation of the motor 594 moves the motor 594 along the lead screw 595 to move the brake pedal support bracket 592 laterally with respect to the accelerator pedal support bracket 590.

The brake pedal support bracket 592 and the clutch pedal support bracket 593 are each fixed to a frame member 595 which is slidably mounted for fore/aft movement on plate 571 by linear bearings and slide rails. A drive motor 597 rotates a lead screw engaged with a drive nut fixed to the frame member 595 to move the frame member 595 and the attached brake pedal support bracket 592 and the clutch pedal support bracket 593 fore and aft relative to the accelerator pedal 572 and, also, to the plate 581 and frame member 571.

The accelerator pedal 572 is mounted on an end of an arcuate track 596 supported in a channel-shaped bracket 599 mounted on the support bracket 590. Similarly, the brake pedal 574 is affixed to an end of an arcuate curved track 598 slidably mounted in a channel-shaped bracket 600 mounted on the brake pedal support bracket 592. Resistance means in the form of a pressurized fluid or gas cylinder 602 is connected to the brake pedal 574 and brake pedal support bracket 592 to provide depression resistance to simulate the normal resistance exerted by a brake cylinder on a brake pedal in a conventional vehicle.

Although a similar resistance means may be provided for the accelerator pedal 572, in an exemplary embodiment, a spring, not shown, is connected to the accelerator pedal support bracket 590 and to one end of the accelerator pedal track 596 to bias the accelerator pedal 572 to its normal position and to provide resistance during depression of the accelerator pedal 572.

Figure 20:
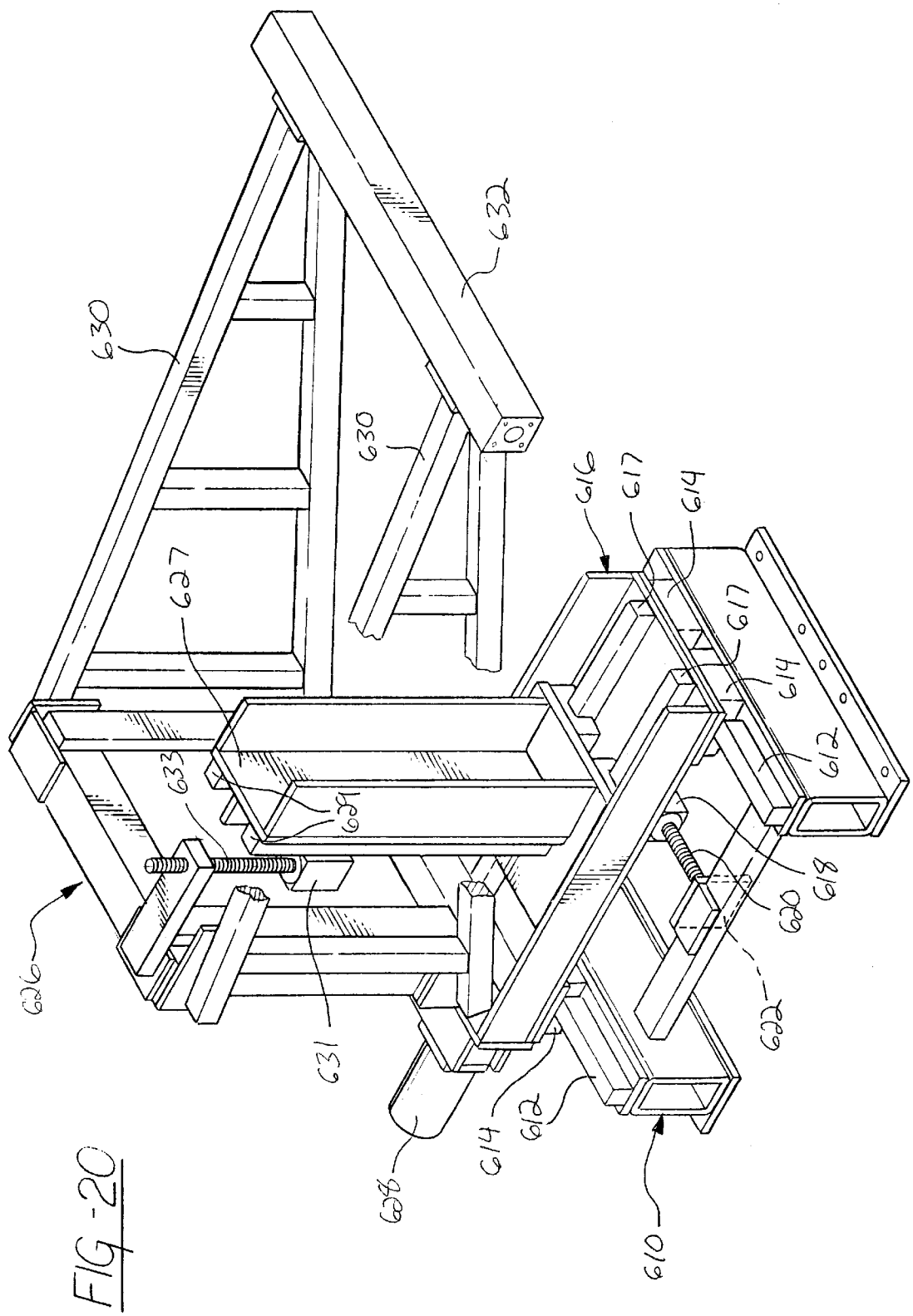
FIG. 20 is a partial, perspective view showing the instrument panel positioning mechanism of the present invention.
Figure 21:
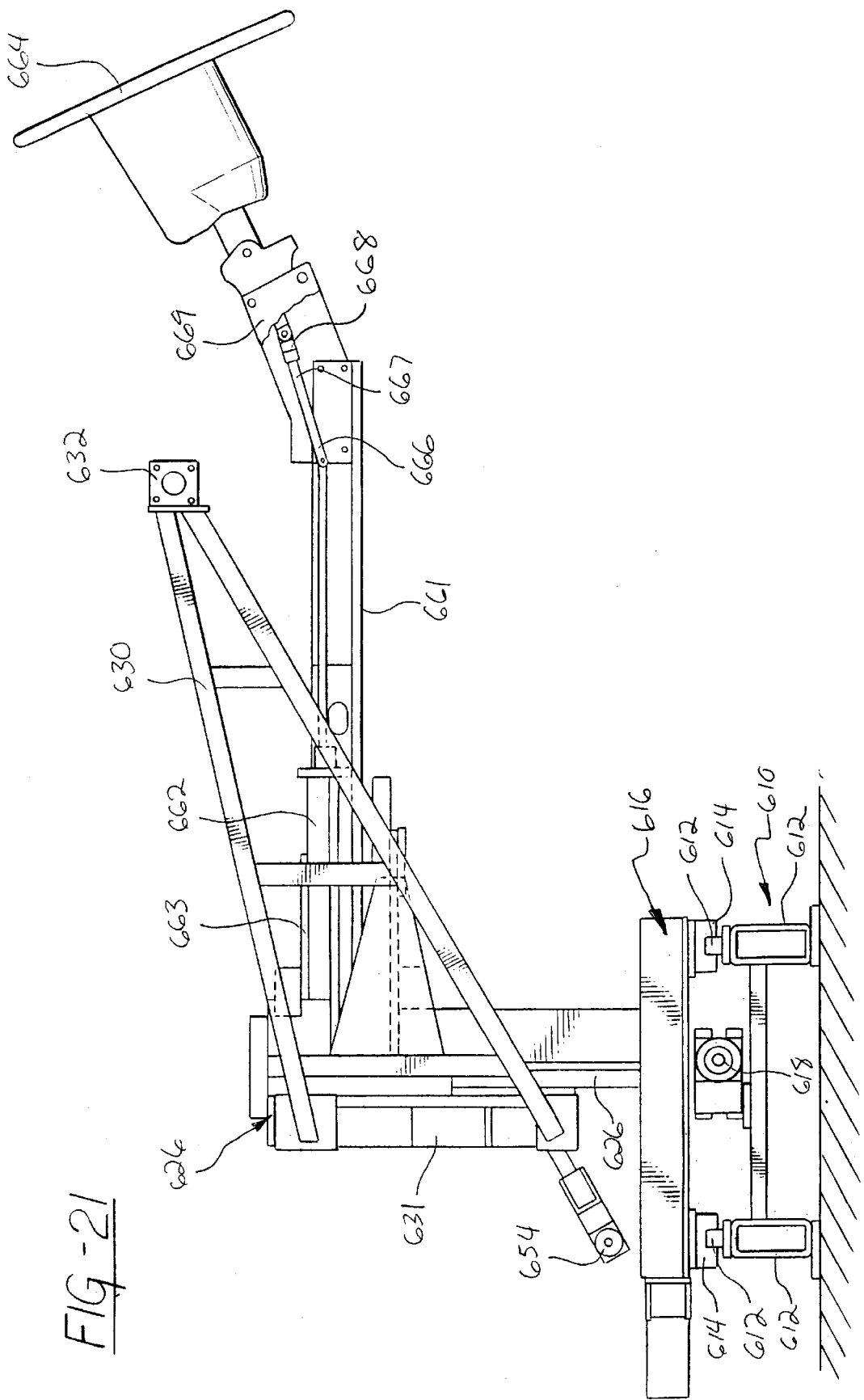
FIG. 21 is a perspective view of a steering column adjustment mechanism which is mounted on the instrument panel adjustment mechanism of FIG. 20.

Referring now to FIGS. 20 and 21 there are depicted a variably positionable instrument panel and steering column assembly used in the programmable vehicle model 10 of the present invention. A tubular frame 610 is mounted on the front cross car plate 60 and is laterally movable with lateral adjustment of the position of the front cross car plate 60. A pair of rails 612 are mounted on a pair of tubular frame members in the frame 610 and support bearings 614 which engage the bottom surface of a longitudinally extending channel member 616 The channel member 616 has a generally U-shape.

A drive motor 618 is fixed to the bottom surface of the channel member 616 and rotates a lead screw 620 which engages a drive nut fixed to a strap 622 extending between opposed tubular members in the frame 610. In this manner, rotation of the lead screw 620 causes lateral repositioning of the channel member 616.

A pair of spaced bearings and slide rails 617 are connected between an inner surface of the channel member 616 and a vertically extending frame 626 form of interconnected tubular members. The drive motor 628 mounted in the channel member 616 rotates a lead screw, not shown, which engages the drive nut fixed to the frame 626 to effect longitudinal fore/aft adjustment of the frame 626 with respect to the channel member 616.

It should be understood that both of the lateral movement and longitudinal fore/aft movement described above and controlled by the motors 618 and 628 reposition both the instrument panel and the steering column laterally and longitudinally as a unit within the programmable vehicle model 10.

Another U-shaped post 627 is coupled to the tubular frame 626 and slidably mounted by means of linear bearing on the slide rails 617 in the U-shaped channel 616. Slide bearings 629 are mounted on a back surface of the post 627 and engage linear bearings carrying a bracket fixed to a vertical drive motor 631. The drive motor 631 carries an integral drive nut which engages a lead screw 633 rotatably supported by a bracket to an upper end of the tubular frame 626 and a lower plate on which the post 627 is supported. The tubular frame 626 is connected to the bearing and driven vertically by the drive motor 631 for global repositioning of the instrument panel in the steering column as a unit in up and down directions.

A pair of angular support frames 630 are connected at one end of the tubular frame 626 and at another end to a cross rail 632 which supports a dashboard or instrument panel.

Figure 22:
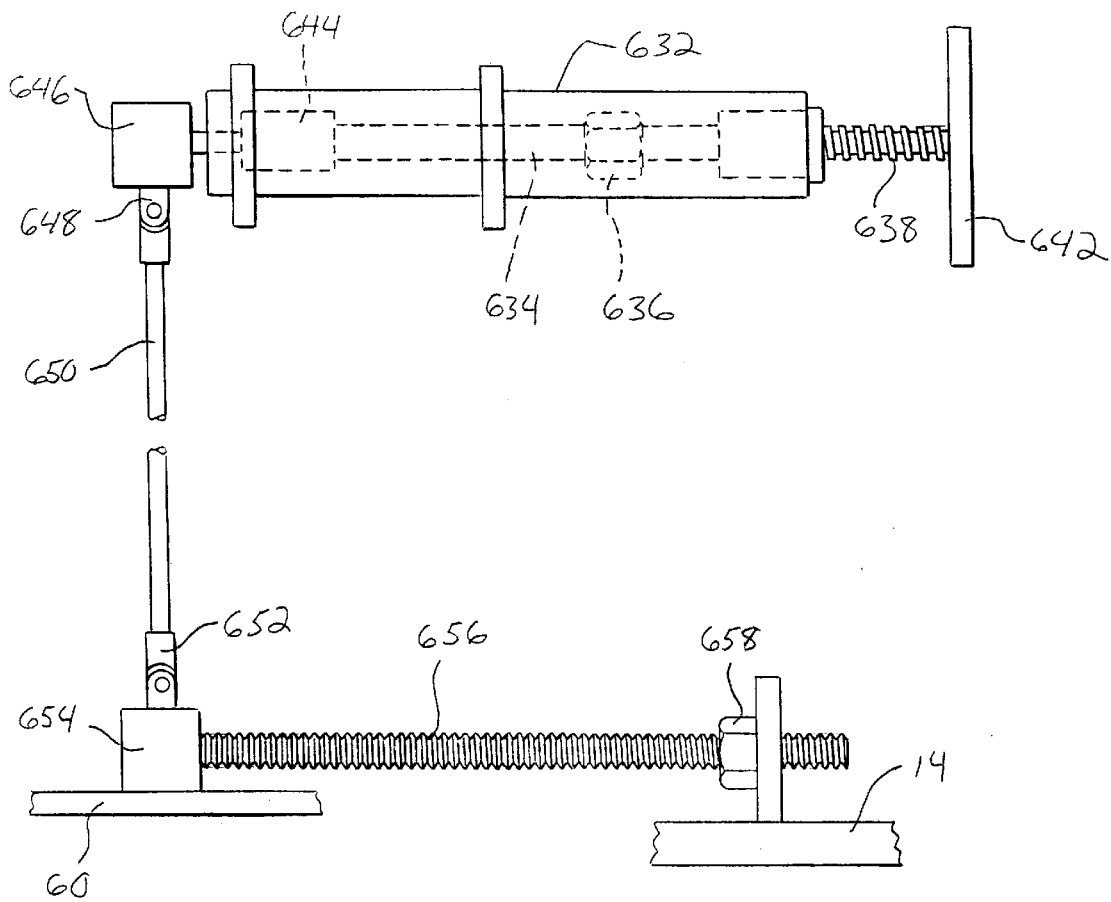
FIG. 22 is a front elevational view of a portion of the instrument panel cross car adjustment mechanism shown in FIG. 20.

The cross rail 632 is hollow, as shown in FIG. 22 and receives a serial arrangement of an Acme screw 634, an Acme nut 636, a spline shaft 638 and a spline nut 640. The spline shaft 638 supports a pad 642 at an outer end to which the right hand portion of the telescoping instrument panel is mounted. The right hand instrument panel is fixedly attached to the A pillar, not shown, so as to be retained in position during lateral movement of the right hand A pillar.

The Acme screw 634 projects through the Acme nut 636 and into one end of the spline 638. Rotation of the Acme screw 634 causes extension of the Acme screw 634 relative to the spline shaft 638.

The other end of the Acme shaft 634 is connected by a universal joint 634 to a Crown drive or gear box 646. The output of the gear box 646 is connected through a universal joint 648 to a rotatable shaft 650. The other end of the shaft 650 is connected through a similar universal joint 652 to a 90° gear box 654 which is mounted on the first or front cross-car plate 60. The gear box 654 is coupled to a rotatable lead screw 656 which engages a drive nut 658 fixed by a bracket to the center tubular member 14 of the platform 12.

This arrangement couples lateral movement of the first or front cross-car plate 60 to telescoping extension or retraction of the spline shaft 638 out of or into the cross rail 632 to effect a telescoping extension of the two overlapped instrument panel section automatically with lateral cross-car adjustment of the first cross-car plate 60.

As shown in FIG. 21, a pair of side supports 659 are mounted to the tubular frame 626 and slidable vertically along with the frame 626 along the linear bearings mounted the back surface of the post 627. A support arm 659 supports a plate 660 which carries an elongated channel member 661 therein.

The drive motor 662 is mounted on the channel 661 and moves along a lead screw 663 rotatably supported at one end on the support post 627. The motor 662 is fixed to the channel 661 for longitudinal fore/aft adjustment of the channel 661 and the attached steering wheel 664. Another motor 665 is fixedly mounted on the channel 661 and drives a lead screw which is connected through a universal joint 666 to an Acme threaded shaft 667. The shaft 667 threadingly engages an Acme nut 668 mounted in a shaft pivotally connected to a bracket carrying a steering wheel 664. The bracket 669 is pivotally mounted to one end of the channel 661. In this manner, activation of the motor 665 can cause bi-directional pivotal movement of the steering wheel 664 relative to the underlying channel 661.

Figure 23:
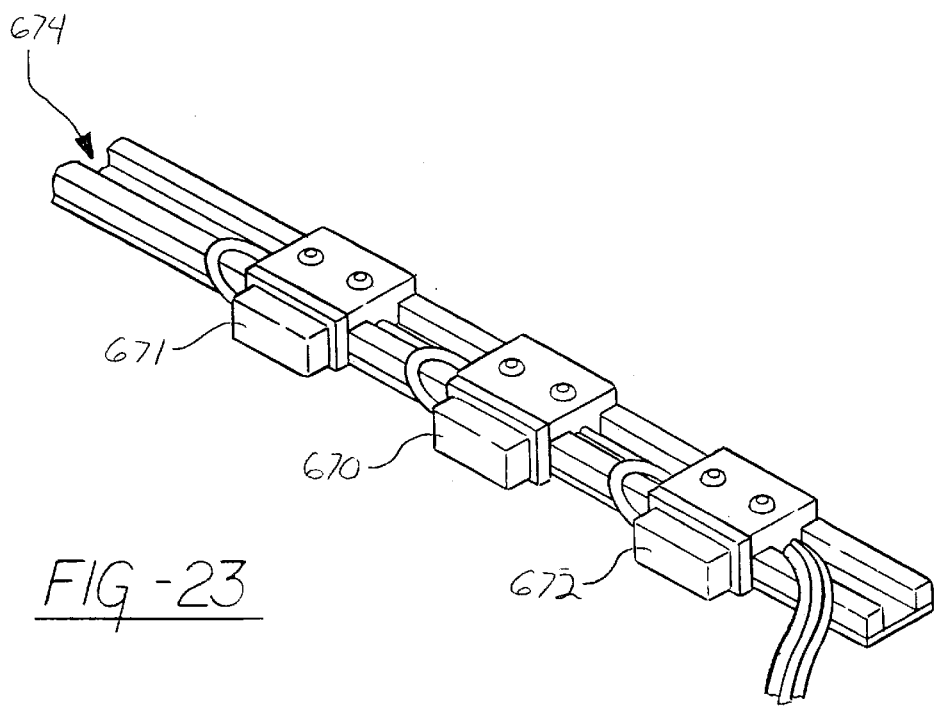
FIG. 23 is a perspective view of one of the limit switch modules employed with each of the adjustable body panels and components of the programmable vehicle model.

As shown in FIG. 23, a plurality of limit switches 670, 671 and 672 are mounted on a mounting plate 674 in an appropriate position with each moveable member or frame of the programmable vehicle model 10 to provide positional information to the controller. For example, the three limit switches 670, 671 and 672 are proximity switches which detect the presence of a bracket or flange projecting from a movable element to provide a home position indication by limit switch 670 as well as maximum and minimum or by directional over travel limits by limit switches 671 and 672.

In addition, each motor driven shaft or lead screw has an encoder mounted thereon to also provide positional information regarding the exact position of any moveable component of the programmable vehicle model 10.

The encoder, such as the encoder 104 shown in FIG. 4, generates one or more pulses for each single 360° rotation of the lead screw. These pulses are input to a controller 680 and counted to provide positional information for the member attached to or driven by the lead screw within the overall coordinate grid system employed with the programmable vehicle model 10.

The use of the encoder provides positive feedback to the controller 680 to indicate the actual displacement of any selected component of the programmable vehicle model 10. In the programmable vehicle model shown in U.S. Pat. No. 5,384,704, a command to move a particular component a certain distance assumed that the component was actually able to move the full selected distance. The current position of any component displayed in the prior programmable vehicle model was the input displacement amount. However, jam-ups or other interference conditions could arise which would prevent the selected component from moving to its full selected displacement position. The present programmable vehicle model through use of the encoders solves this deficiency by providing a feedback signal which enables the controller 680 to determine the exact current position of any selected component thereby ensuring that any selected component has been displaced or moved to its full selected displacement position. If a jam-up or interference occurs, it will be immediately recognized by the controller 680 and appropriate alarms generated.

The controller 680 shown in FIG. 1 is a computer having a central processing unit which executes a control program stored in a memory. The computer may be any personal or microcomputer, or a special purpose computer. The controller 680 includes a keyboard 682 and a monitor or display 684.

In a preferred embodiment, the controller 680 is connected to a VME bus to provide signal and data communication between the various inputs and outputs on the programmable vehicle model 10 as described above. The VME bus is connected to various output ports, a serial communication port and system drivers. The output to the various stepper motors utilizes a multiplexed stepper control apparatus, such as that described in U.S. Pat. No. 5,237,250, the contents of which are incorporated herein in its entirety.

The control program executed by the controller 680 counts the number of rotations of each motor from a center or home position and correlates the number of rotations to travel distance, such as distance amounts measured in millimeters from a center home position established for each motor. In a preferred embodiment, the motors on the programmable vehicle model 10 are stepper motors. The controller 680 controls the amount and direction of rotation of the output shaft in the attached ball screw for each stepper motor. As is conventional, the controller 680 activates a stepper motor driver which generates appropriate control signals to each motor to control the duration and direction of rotation of the output shaft of each stepper motor. The multiplexer control apparatus and the stepper motor drivers are housed entirely within the vehicle model 10 within the cavities or receptacles formed at the front and rear ends of the platform 12, as shown in FIG. 2.

The controller 680 also controls a friction brake associated with most of the drive motors which locks the ball screw or shaft rotated by each motor in a fixed position. This is essential during use the programmable vehicle model 10, such as the opening doors, etc.

The controller 680 executes a Windows-based menu driven program which generates various menu screens depicting various positions of the moveable components of the programmable vehicle model 10 as well as providing an operator with selection features for moving any moveable component to any desired position within its travel range. An example of such a menu is shown in FIG. 24 which depicts representative movement axes of the programmable vehicle model 10, the current position and maximum and minimum positions of each moveable component along its movement axis. The operator may select an individual axis and then adjust the position of the component on the selected axis in either plus or minus directions through appropriate menu selection.

The operator can also select one of several individual vehicle configurations, such as those simulating certain existing vehicles or future prototype vehicles, which are stored in the memory of the controller 380 and can be recalled by the operator at any time simply by accessing an appropriate menu screen, shown in FIG. 25 listing all of the saved vehicle configurations and selecting one of the configurations. Once one configuration is selected, the controller 380 adjusts the position of each component of the programmable vehicle model 10 to the saved, home position of each component.

During any use of a particular vehicle configuration, the operation can select a home position for any axis to thereby cause the component on the selected axis to return to its home position from any jogged or adjusted position.

The controller 380 is also capable of storing any existing position of any component on any axis of the programmable vehicle model 10 to define the position on the selected axis for a particular vehicle configuration.

FIGS. 26–29 depict the use of certain modules or components of the programmable vehicle model 10 in a stand alone simulated vehicle interior or in an actual vehicle.

Figure 26:
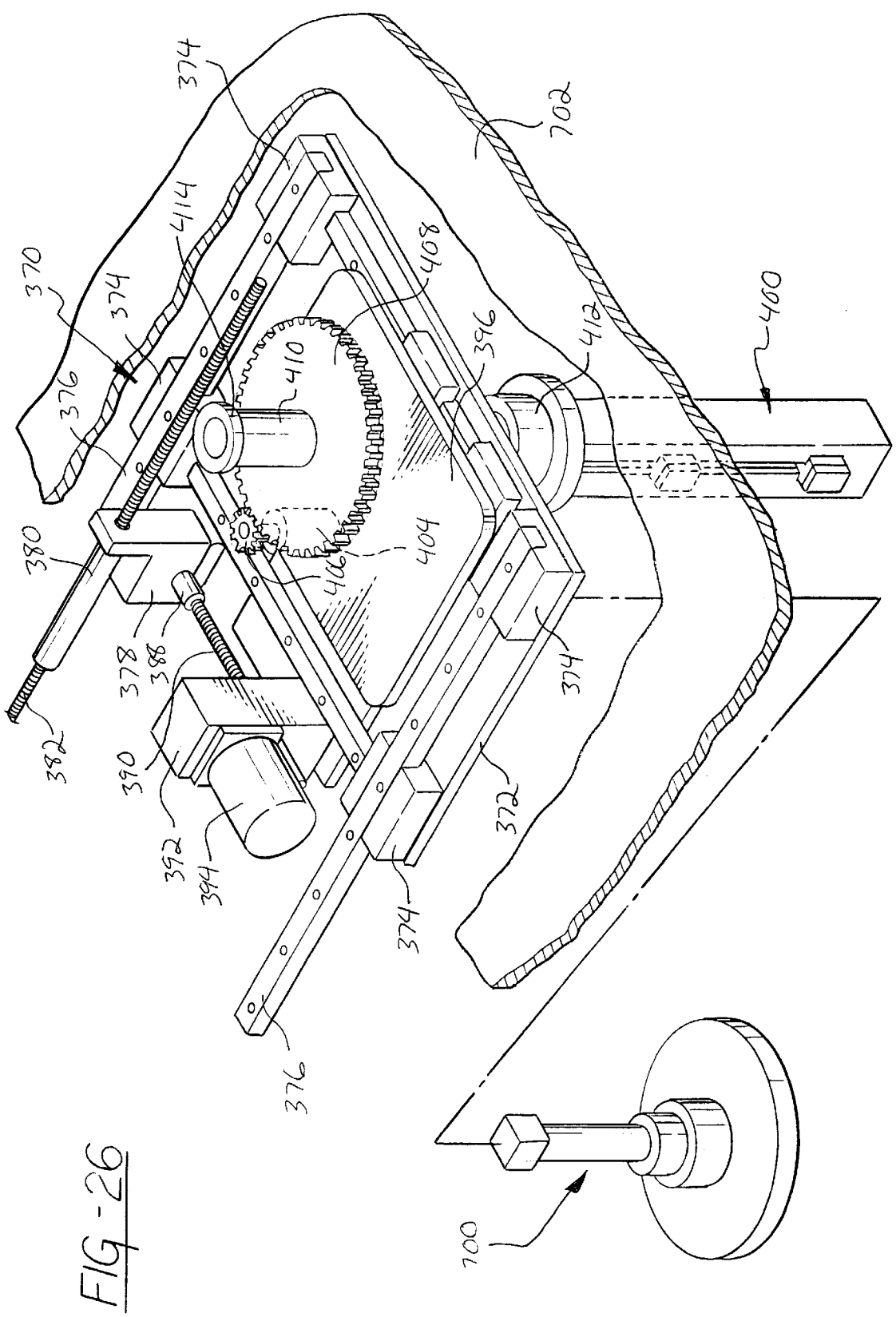
FIG. 26 is a partial, perspective view depicting the mounting of a seat frame of the present invention in an actual vehicle.

As shown in FIG. 26, a seat module 370 can be mounted by means of an adjustable height base 700 connected to the underlying seat frame or plate on an underlying floor or support surface. An aperture is formed in a substantially complete vehicle floor pan 702 with the seat frame 370 situated within the aperture. The remaining portion of the seat tilt mechanism, as described above, is mounted on the seat frame 370 for normal operation with a controller 680 or a smaller, version of a similar controller. This stand alone seat frame 370 may be employed for any or all of the front or rear seats of a an actual vehicle.

FIG. 27 depicts one of the floor frames 516 which is also connected to an adjustable height base 370. The floor frame 516 is also situated within an aperture in a conventional floor pan 702 and may be used on a stand alone basis or in conjunction with the seat module 370 shown in FIG. 26.

Both of the stand alone seat modules 370 and floor frame 516 may also be employed in a simulated vehicle cabin or enclosure which does not include the remaining portions of the vehicle, such as the front and rear deck lids, moveable roof, or other features of the programmable vehicle model 10.

Figure 28:
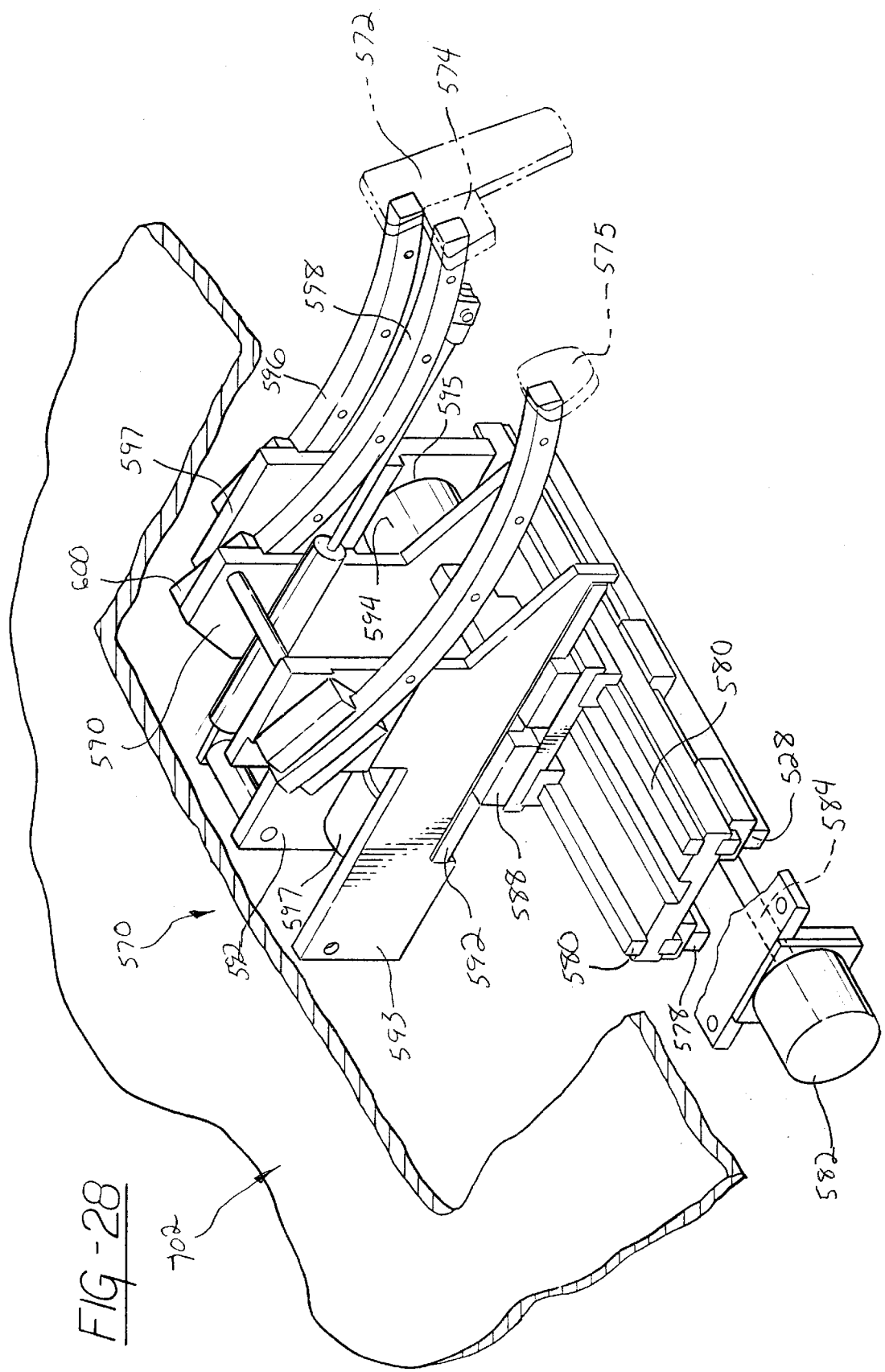
FIG. 28 is a perspective view showing the mounting of the pedal mechanism of the present invention in an actual vehicle.

FIG. 28 depicts the pedal assembly 570 which is mounted on the floor frame 516 as described above. The pedal assembly 570 may also be used with a stand alone floor frame 516 in an aperture in the floor pan 702 of an actual vehicle or in an aperture in a floor pan of a simulated vehicle cabin or passenger compartment.

Figure 29:
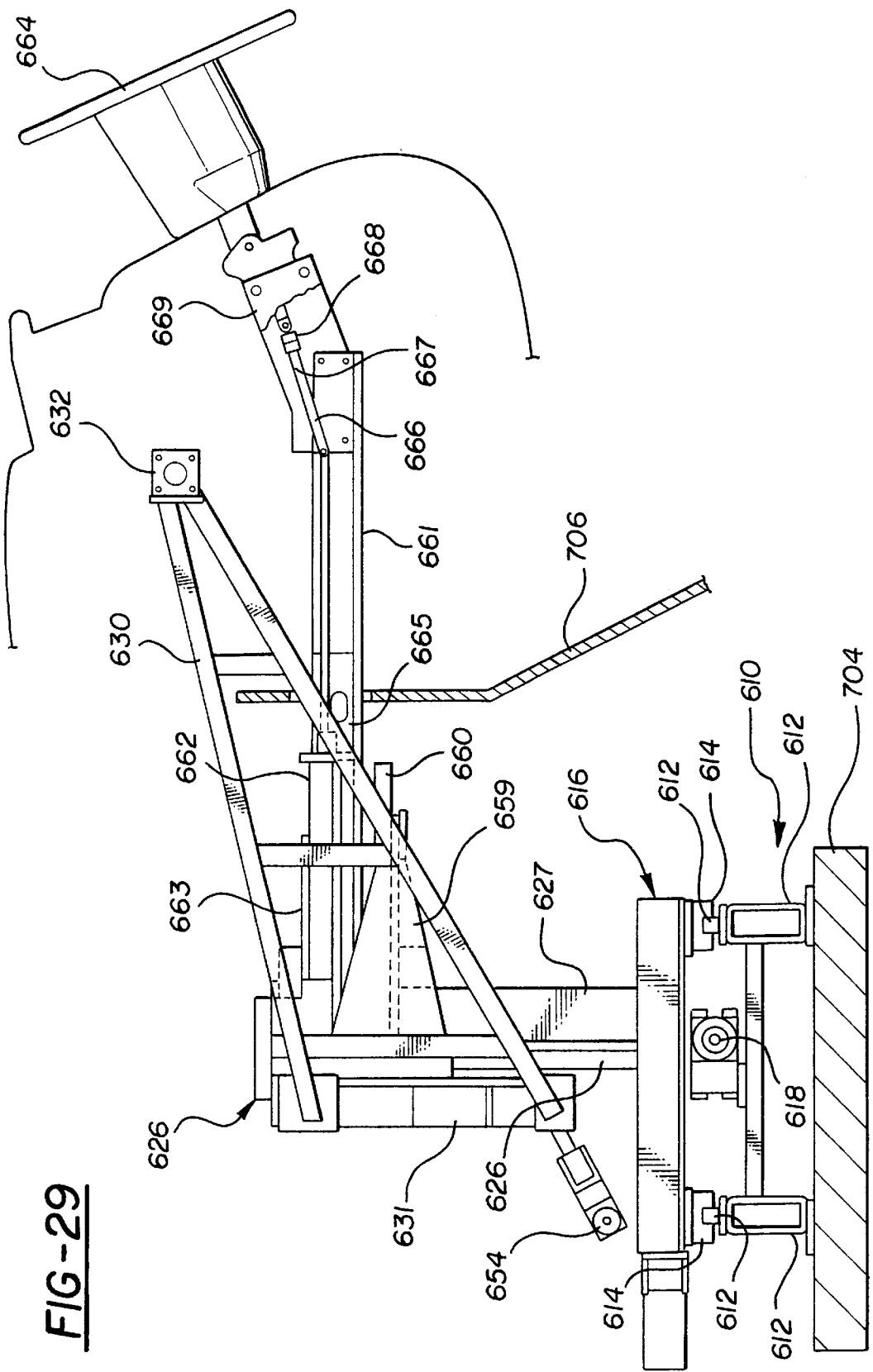
FIG. 29 is a perspective view showing the mounting of the instrument panel/steering column assembly of the present invention in an actual vehicle.

Similarly, as shown in FIG. 29, the instrument panel 626 and steering column assembly may also be employed in a stand alone basis in an actual vehicle or a simulated vehicle cabin or passenger compartment. In such use, the tubular frame members 610 are mounted on a suitable base or support 704 on a floor or support surface. An aperture is formed in the front portion 706 of the vehicle floor pan to enable the instrument panel 626 and steering column to be adjustably disposed within the interior of the vehicle passenger compartment. The instrument panel 626 is also formed in a two part, telescoping assembly as described above in the programmable vehicle model 10.

The adjustable center console 450 shown in FIGS. 14 and 15 and described above may also be employed by itself or preferably with a pair of seat assemblies 370 in an actual vehicle. In a stand alone application, the center console tubular supports 460 are fixedly mounted to an underlying base or support.

Any of the modules or assemblies shown in FIGS. 26–29 may be employed on a stand alone, individual basis or in any combination depending upon the needs of a particular application.

What is claimed is:

1. A dimensionally adjustable vehicle component comprising:

a base;

a first plate;

means, coupled between the first plate and the base, for longitudinally moving the first plate relative to the base;

a second plate movably disposed relative to the first plate;

means, coupled to the second plate, for laterally moving the second plate relative to the first plate;

vertical elevatable means, coupled to the second plate, for vertically elevating the second plate;

a mount carried on the vertical elevatable means; and seat mounting pads, carried on the mount, for attachment to a seat.

2. The vehicle component of claim 1 further comprising:

the seat mounting pads disposed on at least one track slidably mounted on the mount; and drive means, coupled to the at least one track, for sliding the at least one track with respect to the mount to change the orientation of the seat mounting pads with respect to the base.

3. The vehicle component of claim 2 further comprising:

the at least one track having an arcuate shape between opposed ends.

4. A dimensionally adjustable vehicle component comprising:

a base;

vertical elevatable means mounted on the base;

drive means for elevating the vertical elevatable means;

a first floor frame mounted on the vertical elevatable means;

a first floor plate fixed on the first floor frame;

a plurality of second floor frames slidably coupled to the first floor frame, a second plate mounted on each second floor frame and arranged in telescoping overlapping arrangement with the first floor plate to form a solid floor surface; and the first floor frame and the plurality of second floor frames being laterally and longitudinally adjustable with respect to each other.

5. The vehicle component of claim 4 further comprising:

a third floor frame having a third plate mounted thereon;

a plurality of fourth floor frames, each having a fourth plate carried thereon, the third plate and the fourth plates arranged in telescoping overlapping relationship; and means, coupled between the first floor frame and the third floor frame, for varying the lateral spacing between the first floor frame and third floor frame.

6. The vehicle component of claim 4 further comprising:

a seat disposed adjacent to the first floor frame and the plurality of second floor frames; and means, coupled between two rearmost ones of the first and the second floor frames and the seat, for varying the longitudinal overlap of rearmost ones of the first and second plates with respect to frontmost ones of the first and second plates.

7. The vehicle component of claim 4 further comprising:

a toe plate angularly disposed with respect to the first floor frame;

means, coupled between the toe plate and one of the base and the first floor frame for longitudinally moving the toe plate with respect to the first floor frame.

8. The vehicle component of claim 7 further comprising:

a housing simulating a wheel well disposed adjacent to the toe plate; and means, coupled between the housing and first floor frame, for independently moving the housing longitudinally with respect to the first floor frame and the toe plate.

9. A dimensionally adjustable vehicle component comprising:

a base;

a first floor frame carrying a floor panel, the first floor frame carried on the base;

a toe plate angularly disposed with respect to the floor frame; and means, coupled between the first floor frame and the toe plate, for adjusting the longitudinal position of the toe plate relative to the floor first frame.

10. The vehicle component of claim 9 further comprising:

a toe plate angularly disposed with respect to the first floor frame;

means, coupled between the toe plate and one of the base and the first floor frame for longitudinally moving the toe plate with respect to the first floor frame.

11. The vehicle component of claim 10 further comprising:

a housing simulating a wheel well disposed adjacent to the toe plate; and means, coupled between the housing and first floor frame, for independently moving the housing longitudinally with respect to the first floor frame and the toe plate.

12. A dimensionally adjustable vehicle component comprising:

a base mounted on a platform;

accelerator pedal support means, carried on the base, for supporting an accelerator pedal;

brake pedal support means, carried on the base, for supporting a brake pedal;

means for moving the base and the accelerator pedal support means and the brake pedal support means laterally together relative to the platform; and means for selectively laterally spacing the brake pedal support means from the accelerator pedal support means.

13. The vehicle component of claim 12 further comprising:

a first slider mounted on the base, the first slider carrying the brake pedal support means; and drive means, coupled to the first slider, for laterally moving the first slider relative to the base.

14. The vehicle component of claim 13 further comprising:

a second slider carried on the first slider, the second slider carrying the brake pedal support means; and drive means, coupled to the second slider, for moving the second slider and for longitudinally varying the position of the brake pedal support means with respective to the accelerator pedal support means.

15. The vehicle component of claim 12 wherein the accelerator pedal support means comprises:

a first track slidably mounted on an accelerator pedal support bracket carried on the first slider, the accelerator pedal mounted on one end of the first track; and resistance means, coupled to the first track, for biasing the one end of the first track and the accelerator pedal outward from the accelerator pedal support bracket to a foot engagement position and for providing resistance against movement of the first track and the accelerator pedal in an opposed direction.

16. The vehicle component of claim 15 wherein the brake pedal support means comprises:

a second track slidably mounted on a brake pedal support bracket carried on the first slider, the brake pedal mounted on one end of the second track; and resistance means, coupled to the second track, for biasing the one end of the second track and the brake pedal outward from the brake pedal support bracket to a foot engagement position and for providing resistance against movement of the second track and the brake pedal in an opposed direction.

17. The vehicle component of claim 12 further comprising:

a second track slidably mounted on a brake pedal support bracket carried on the first slider, the brake pedal mounted on one end of the second track; and resistance means, coupled to the second track, for biasing the one end of the second track and the brake pedal outward from the brake pedal support bracket to a foot engagement position and for providing resistance against movement of the second track and the brake pedal in an opposed direction.

18. The vehicle component of claim 12 further comprising:

clutch support means for supporting a clutch pedal, the clutch support means mounted on the first slider.

19. A vehicle model comprising:

a platform;

panel support means including first and second pairs of longitudinally spaced pillars, the pillars in each of the first and second pairs of pillars laterally spaced on the platform, each of the first and second pairs of pillars being independently laterally and longitudinally movable relative to the platform;

a plurality of vehicle body panels mounted on the panel support means in a vehicle body position simulating a vehicle; and first and second pairs of upper pillar members, each angularly and extensibly mounted with respect to the first and second pairs of pillars, respectively.

20. The vehicle model of claim 19 further comprising a vehicle roof, the vehicle roof comprising:

a first pair of frontmost roof frames, each carrying a frontmost roof panel;

a second pair of rearmost roof frames, each carrying one rearmost roof panel;

the first and second pairs of frontmost and rearmost roof panels disposed in a telescoping, overlapping, transverse and longitudinal arrangement to form an entire roof; and roof panel drive means, coupled to the first and second pairs of frontmost and rearmost roof frames, for transversely and longitudinally adjusting the position of the first and second pairs of roof frames with respect to each other to vary the perimeter dimensions of a roof formed by the first and second roof panels.

21. The vehicle model of claim 20 further comprising:

means for longitudinally adjusting the position of the entire roof as a unit with respect to the second pair of pillars.

22. The vehicle model of claim 21 wherein the means for longitudinally adjusting the position of the entire roof as a unit comprises:

a pair of supports, one support coupled to each opposed side of one of the first and second pairs of roof frames;

a bracket movable on each support and connected to one of the second pillars; and drive means, carried on one of the supports and coupled to the bracket or each support, for longitudinally adjusting the position of each bracket with respect to one second pillar.

23. The vehicle model of claim 20 further comprising:

first and second supports carried on opposed sides of one of the frontmost and rearmost pairs of roof frames;

a link pivotally connected to each of the first and second supports and arranged for complimentary rotation with an opposed link;

a slider pivotally connected to each link, the slider movably mounted in a block;

a drive nut carried in each block and coupled to the slider, and threadingly receiving a threaded screw;

a universal joint connected to opposed ends of first and second telescopingly extendable shafts and coupled to a threaded shaft; and a gear coupled to one of the universal joints and to one of the threaded shafts for reversing the direction of rotation of the one threaded shaft for identical directional rotation of both of the shafts.

24. The vehicle model of claim 20 further comprising:

a bracket slidably mounted on one of the frontmost roof frames;

a mirror mounted to the bracket;

a pair of racks carried on adjacent surfaces of each of frontmost roof frames; and a gear carried on the bracket and engageable with the racks upon opposed lateral movement of the racks with the roof frames to maintain the bracket in a normal, unmoved position relative to the vehicle model.

25. The vehicle model of claim 19 further comprising:

a base;

a first plate;

means, coupled between the first plate and the base, for longitudinally moving the first plate relative to the base;

a second plate;

means, coupled to the second plate, for laterally moving the second plate relative to the first plate;

vertical elevatable means, coupled to the second plate, for vertically elevating the second plate;

a mount carried on the vertical elevatable means; and seat mounting pads, carried on the mount, for attachment to a seat.

26. The vehicle model of claim 25 further comprising:

the seat mounting pads disposed on at least one track slidably mounted on the mount; and drive means, coupled to the at least one track, for sliding the at least one track with respect to the mount to change the orientation of the seat mounting pads with respect to the base.

27. The vehicle model of claim 19 further comprising:

a base mounted on a platform;

accelerator pedal support means, carried on the base, for supporting an accelerator pedal;

brake pedal support means, carried on the base, for supporting a brake pedal;

means for moving the base and the accelerator pedal support means and the brake pedal support means laterally together relative to the platform; and means for selectively laterally spacing the brake pedal support means from the accelerator pedal support means.

28. The vehicle model of claim 27 further comprising:

a first slider mounted on the base, the first slider carrying the brake pedal support means; and drive means, coupled to the first slider, for laterally moving the first slider relative to the base.

29. The vehicle model of claim 28 further comprising:

a second slider carried on the first slider, the second slider carrying the brake pedal support means; and drive means, coupled to the second slider for moving the second slider and for longitudinally varying the position of the brake pedal support means with respective to the accelerator pedal support means.

30. The vehicle model of claim 27 wherein the accelerator pedal support means comprises:

a first track slidably mounted on an accelerator pedal support bracket carried on the first slider, the accelerator pedal mounted on one end of the first track; and resistance means, coupled to the first track, for biasing the one end of the first track and the accelerator pedal outward from the accelerator pedal support bracket to a foot engagement position and for providing resistance against movement of the first track and the accelerator pedal in an opposed direction.

31. The vehicle model of claim 30 wherein the brake pedal support means comprises:

a second track slidably mounted on a brake pedal support bracket carried on the first slider, the brake pedal mounted on one end of the second track; and resistance means, coupled to the second track, for biasing the one end of the second track and the brake pedal outward from the brake pedal support bracket to a foot engagement position and for providing resistance against movement of the second track and the brake pedal in an opposed direction.

32. The vehicle model of claim 27 further comprising:

a second track slidably mounted on a brake pedal support bracket carried on the first slider, the brake pedal mounted on one end of the second track; and resistance means, coupled to the second track, for biasing the one end of the second track and the brake pedal outward from the brake pedal support bracket to a foot engagement position and for providing resistance against movement of the second track and the brake pedal in an opposed direction.

33. The vehicle model of claim 27 further comprising:

clutch support means for supporting a clutch pedal, the clutch support means mounted on the first slider.

34. The vehicle model of claim 19 further comprising:

a base;

vertical elevatable means mounted on the base;

drive means for elevating the vertical elevatable means;

a first floor frame mounted on the vertical elevatable means;

a first floor plate fixed on the first floor frame assembly;

a plurality of second floor frames slidably coupled to the first floor frame, a second plate mounted on each second floor frame and arranged in telescopingly overlapping arrangement with the first floor plate to form a solid floor surface; and the first floor frame and the plurality of second floor frames being laterally and longitudinally adjustable with respect to each other.

35. The vehicle model of claim 34 further comprising:

a third floor frame having a third plate mounted thereon;

a plurality of fourth floor frames, each having a fourth plate carried thereon, the third plate and the fourth plates arranged in telescoping overlapping relationship; and means, coupled between the first floor frame and the third floor frame, for varying the lateral spacing between the first floor frame and the third floor frame.

36. The vehicle model of claim 34 further comprising:

a seat disposed adjacent to the first floor frame and the plurality of second floor frames; and means, coupled between the two rearmost ones of the first and the second floor frames and the seat, for varying the longitudinal overlap of rearmost ones of the first and second plates with respect to frontmost ones of the first and second plates.

37. The vehicle model of claim 34 further comprising:

a base;

a first plate;

means, coupled between the first plate and the base, for longitudinally moving the first plate relative to the base;

a second plate;

means, coupled to the second plate, for laterally moving the second plate relative to the first plate;

vertical elevatable means, coupled to the second plate, for vertically elevating the second plate;

a mount carried on the vertical elevatable means; and seat mounting pads, disposed on the mount, for attachment to a seat.

38. The vehicle model of claim 37 further comprising:

the seat mounting pads disposed on at least one track slidably mounted in a bracket on the mount; and drive means, coupled to the at least one track, for sliding the at least one track with respect to the bracket to change the angular orientation of the seat with respect to the base.

39. The vehicle model of claim 37 further comprising:

a base;

a first floor frame carrying a floor panel, the first floor frame carried on the base;

a toe plate angularly disposed with respect to the floor frame; and means, coupled between the first floor frame and the toe plate, for adjusting the longitudinal position of the toe plate relative to the first floor frame.

40. The vehicle model of claim 39 further comprising:

a housing simulating a wheel well disposed adjacent to the toe plate; and means, coupled between the housing and first floor frame, for independently moving the housing longitudinally with respect to the first floor frame and the toe plate.

41. The vehicle model of claim 34 comprising:

a base;

a first floor frame carrying a floor panel, the first floor frame carried on the base;

a toe plate angularly disposed with respect to the floor frame; and means, coupled between the first floor frame and the toe plate, for adjusting the longitudinal position of the toe plate relative to the first floor frame.

42. The vehicle model of claim 41 further comprising:

a housing simulating a wheel well disposed adjacent to the toe plate; and means, coupled between the housing and first floor frame, for independently moving the housing longitudinally with respect to the first floor frame and the toe plate.

43. The vehicle model of claim 41 further comprising:

a base mounted on a platform;

accelerator pedal support means, carried on the base, for supporting an accelerator pedal;

brake pedal support means, carried on the base, for supporting a brake pedal;

means for moving the base and the accelerator pedal support means and the brake pedal support means laterally together relative to the platform; and means for selectively laterally spacing the brake pedal support means from the accelerator pedal support means.

44. The vehicle model of claim 43 further comprising:

a first slider mounted on the base, the first slider carrying the brake pedal support means; and drive means, coupled to the first slider, for laterally moving the first slider relative to the base.

45. The vehicle model of claim 44 further comprising:

a second slider carried on the first slider, the second slider carrying the brake pedal support means; and drive means, coupled to the second slider for moving the second slider and for longitudinally varying the position of the brake pedal support means with respective to the accelerator pedal support means.

46. The vehicle model of claim 43 wherein the accelerator pedal support means comprises:

a first track slidably mounted on an accelerator pedal support bracket carried on the first slider, the accelerator pedal mounted on one end of the first track; and resistance means, coupled to the first track, for biasing the one end of the first track and the accelerator pedal outward from the accelerator pedal support bracket to a foot engagement position and for providing resistance against movement of the first track and the accelerator pedal in an opposed direction.

47. The vehicle model of claim 46 wherein the brake pedal support means comprises:

a second track slidably mounted on a brake pedal support bracket carried on the first slider, the brake pedal mounted on one end of the second track; and resistance means, coupled to the second track, for biasing the one end of the second track and the brake pedal outward from the brake pedal support bracket to a foot engagement position and for providing resistance against movement of the second track and the brake pedal in an opposed direction.

48. The vehicle component of claim 43 further comprising:

a second track slidably mounted on a brake pedal support bracket carried on the first slider, the brake pedal mounted on one end of the second track; and resistance means, coupled to the second track, for biasing the one end of the second track and the brake pedal outward from the brake pedal support bracket to a foot engagement position and for providing resistance against movement of the second track and the brake pedal in an opposed direction.

49. The vehicle component of claim 43 further comprising:

clutch support means for supporting a clutch pedal, the clutch support means mounted on the first slider.

50. The vehicle model of claim 34 further comprising:

a base mounted on a platform;

accelerator pedal support means, carried on the base, for supporting an accelerator pedal;

brake pedal support means, carried on the base, for supporting a brake pedal;

means for moving the base and the accelerator pedal support means and the brake pedal support means laterally together relative to the platform; and means for selectively laterally spacing the brake pedal support means front he accelerator pedal support means.

51. The vehicle model of claim 50 further comprising:

a first slider mounted on the base, the first slider carrying the brake pedal support means; and drive means, coupled to the first slider, for laterally moving the first slider relative to the base.

52. The vehicle model of claim 51 further comprising:

a second slider carried on the first slider, the second slider carrying the brake pedal support means; and drive means, coupled to the second slider for moving the second slider and for longitudinally varying the position of the brake pedal support means with respective to the accelerator pedal support means.

53. The vehicle model of claim 50 wherein the accelerator pedal support means comprises:

a first track slidably mounted on an accelerator pedal support bracket carried on the first slider, the accelerator pedal mounted on one end of the first track; and resistance means, coupled to the first track, for biasing the one end of the first track and the accelerator pedal outward from the accelerator pedal support bracket to a foot engagement position and for providing resistance against movement of the first track and the accelerator pedal in an opposed direction.

54. The vehicle model of claim 53 wherein the brake pedal support means comprises:

a second track slidably mounted on a brake pedal support bracket carried on the first slider, the brake pedal mounted on one end of the second track; and resistance means, coupled to the second track, for biasing the one end of the second track and the brake pedal outward from the brake pedal support bracket to a foot engagement position and for providing resistance against movement of the second track and the brake pedal in an opposed direction.

55. The vehicle component of claim 50 further comprising:

a second track slidably mounted on a brake pedal support bracket carried on the first slider, the brake pedal mounted on one end of the second track; and resistance means, coupled to the second track, for biasing the one end of the second track and the brake pedal outward from the brake pedal support bracket to a foot engagement position and for providing resistance against movement of the second track and the brake pedal in an opposed direction.

56. The vehicle component of claim 50 further comprising:

clutch support means for supporting a clutch pedal, the clutch support means mounted on the first slider.

57. The vehicle model of claim 19 further comprising:

a base;

a first floor frame carrying a floor panel, the first floor frame carried on the base;

a toe plate angularly disposed with respect to the floor frame; and means, coupled between the first floor frame and the toe plate, for adjusting the longitudinal position of the toe plate relative to the first floor frame.

58. The vehicle model of claim 57 further comprising:

a housing simulating a wheel well disposed adjacent to the toe plate; and means, coupled between the housing and first floor frame, for independently moving the housing longitudinally with respect to the first floor frame and the toe plate.

59. The vehicle model of claim 19 further comprising:
a housing simulating a wheel well disposed adjacent to the toe plate; and
means, coupled between the housing and first floor frame, for independently moving the housing longitudinally with respect to the first floor frame and the toe plate.

60. The vehicle model of claim 19 further comprising:
a base mounted on a platform;
accelerator pedal support means, carried on the base, for supporting an accelerator pedal;
brake pedal support means, carried on the base, for supporting a brake pedal;
means for moving the base and the accelerator pedal support means and the brake pedal support means laterally together relative to the platform; and
means for selectively laterally spacing the brake pedal support means from the accelerator pedal support means.

61. The vehicle component of claim 60 further comprising:
a first slider mounted on the base, the first slider carrying the brake pedal support means; and
drive means, coupled to the first slider, for laterally moving the first slider relative to the base.

62. The vehicle model of claim 61 further comprising:
a second slider carried on the first slider, the second slider carrying the brake pedal support means; and
drive means, coupled to the second slider for moving the second slider and for longitudinally varying the position of the brake pedal support means with respective to the accelerator pedal support means.

63. The vehicle model of claim 60 wherein the accelerator pedal support means comprises:
a first track slidably mounted on an accelerator pedal support bracket carried on the first slider, the accelerator pedal mounted on one end of the first track; and
resistance means, coupled to the first track, for biasing the one end of the first track and the accelerator pedal outward from the accelerator pedal support bracket to a foot engagement position and for providing resistance against movement of the first track and the accelerator pedal in an opposed direction.

64. The vehicle model of claim 63 wherein the brake pedal support means comprises:
a second track slidably mounted on a brake pedal support bracket carried on the first slider, the brake pedal mounted on one end of the second track; and
resistance means, coupled to the second track, for biasing the one end of the second track and the brake pedal outward from the brake pedal support bracket to a foot engagement position and for providing resistance against movement of the second track and the brake pedal in an opposed direction.

65. The vehicle model of claim 60 further comprising:
a second track slidably mounted on a brake pedal support bracket carried on the first slider, the brake pedal mounted on one end of the second track; and
resistance means, coupled to the second track, for biasing the one end of the second track and the brake pedal outward from the brake pedal support bracket to a foot engagement position and for providing resistance against movement of the second track and the brake pedal in an opposed direction.

66. The vehicle model of claim 60 further comprising:
clutch support means for supporting a clutch pedal, the clutch support means mounted on the first slider.

67. The vehicle model of claim 19 further comprising:
drive means, including an electric motor coupled to a rotatable shaft coupled to one panel support means, for adjusting the dimensional position of the panel support means;
encoder means for generating output pulses upon rotation of an output shaft of the motor; and
control means, coupled to the drive means and responsive to the encoder means, for controlling the drive means and for determining the actual position of the panel support means being adjusted.

* * * * *